US011075735B2

(12) United States Patent
Lee et al.

(10) Patent No.: US 11,075,735 B2
(45) Date of Patent: *Jul. 27, 2021

(54) METHOD FOR RECEIVING CONTROL INFORMATION FOR REFERENCE SIGNAL RELATED TO PHASE NOISE ESTIMATION AND USER EQUIPMENT THEREFOR

(71) Applicant: LG Electronics Inc., Seoul (KR)

(72) Inventors: Kilborn Lee, Seoul (KR); Hyunsoo Ko, Seoul (KR); Kyuseok Kim, Seoul (KR); Kijun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 24 days.

This patent is subject to a terminal disclaimer.

(21) Appl. No.: 16/730,250

(22) Filed: Dec. 30, 2019

(65) Prior Publication Data

US 2020/0145161 A1 May 7, 2020

Related U.S. Application Data

(63) Continuation of application No. 16/381,529, filed on Apr. 11, 2019, now Pat. No. 10,554,364, which is a
(Continued)

(51) Int. Cl.
*H04L 5/00* (2006.01)
*H04L 1/00* (2006.01)
(Continued)

(52) U.S. Cl.
CPC ............. *H04L 5/0051* (2013.01); *H04L 1/00* (2013.01); *H04L 5/0092* (2013.01);
(Continued)

(58) Field of Classification Search
CPC ....... H04L 5/0051; H04L 1/00; H04L 7/0054; H04L 5/0092; H04L 27/22; H04L 5/0007;
(Continued)

(56) References Cited

U.S. PATENT DOCUMENTS 8,559,990 B2 10/2013 Jiang et al.
8,737,208 B2 5/2014 Ohseki et al.
(Continued)

FOREIGN PATENT DOCUMENTS

CN 104285462 1/2015
CN 105144817 12/2015
(Continued)

OTHER PUBLICATIONS

Hsieh, Cheng-Kuan, Jyh-Cheng Chen, and Jeng-Feng Weng. "Cooperative adaptive partner selection for real-time services in IEEE 802.16 j multihop relay networks." 2010 IEEE Wireless Communication and Networking Conference. IEEE, 2010. (Year: 2010).*
(Continued)

*Primary Examiner* — Sharad Rampuria
(74) *Attorney, Agent, or Firm* — Fish & Richardson P.C.

(57) ABSTRACT

A method for receiving control information for a reference signal related to phase noise estimation by a user equipment (UE) comprises receiving control information indicating whether the reference signal related to the phase noise estimation is transmitted; when the control information indicates that the reference signal is transmitted, receiving the reference signal based on the control information; wherein when a size of a traffic resource block (RB) for the UE is greater than a predetermined value, the control information indicates the reference signal is transmitted.

20 Claims, 23 Drawing Sheets

Related U.S. Application Data continuation of application No. 15/780,087, filed as application No. PCT/KR2017/010956 on Sep. 29, 2017, now Pat. No. 10,523,393.

(60) Provisional application No. 62/417,367, filed on Nov. 4, 2016, provisional application No. 62/401,954, filed on Sep. 30, 2016.

(51) Int. Cl.
  *H04L 7/00* (2006.01)
  *H04L 27/22* (2006.01)
  *H04B 17/309* (2015.01)

(52) U.S. Cl.
  CPC .......... *H04L 7/0054* (2013.01); *H04B 17/309* (2015.01); *H04L 5/0007* (2013.01); *H04L 27/22* (2013.01)

(58) Field of Classification Search
  CPC .. H04B 17/309; H04B 7/2121; H04B 7/2123; H04J 2203/0069; H04Q 2213/394; H04W 72/04; H04W 72/12; H04W 76/00
  See application file for complete search history.

(56) References Cited

U.S. PATENT DOCUMENTS

| | | | |
|---|---|---|---|
| 9,059,760 | B2 | 6/2015 | Jiang et al. |
| 9,209,843 | B2 | 12/2015 | Eliaz |
| 10,116,483 | B2 | 10/2018 | Islam et al. |
| 2014/0023155 | A1 | 1/2014 | Khoryaev et al. |
| 2014/0293881 | A1 | 10/2014 | Khoshnevis et al. |
| 2016/0006594 | A1 | 1/2016 | Persson et al. |
| 2016/0087709 | A1 | 3/2016 | Horiuchi et al. |
| 2018/0041321 | A1 | 2/2018 | Guo et al. |
| 2019/0123864 | A1* | 4/2019 | Zhang ................ H04B 7/024 |

FOREIGN PATENT DOCUMENTS

| | | |
|---|---|---|
| CN | 107733612 | 2/2018 |
| EP | 2843983 | 3/2015 |
| JP | 2019504565 | 2/2019 |
| JP | 2019506066 | 2/2019 |
| JP | 2019518364 | 6/2019 |
| KR | 1020150010044 | 1/2015 |
| RU | 2433552 | 11/2011 |
| WO | WO2016000915 | 1/2016 |
| WO | WO2018063854 | 4/2018 |

OTHER PUBLICATIONS

Chinese Office Action in Chinese Application No. 201780047233.9, dated Oct. 18, 2019, 13 pages (with English translation).
Ericsson, "Frame structure and DMRS positions," R1-167079, 3GPP TSG-RAN WG1 #86, Gothenburg, Sweden, Aug. 22-26, 2016, 6 pages.
Huawei, HiSilicon, "Discussion on time domain structures," R1-166104, 3GPP TSG RAN WG1 Meeting #86, Gothenburg, Sweden, Aug. 22-26, 2016, 7 pages.
Intel Corporation, "Study of phase noise tracking," R1-166562, 3GPP TSG-RAN WG1 #86, Aug. 22-26, 2016, 6 pages.
Intel Corporation, "Study of phase noise tracking," R1-167888, 3GPP TSG-RAN WG1 #86, Gothenburg, Sweden, Aug. 22-26, 2016, 9 pages.
Japanese Office Action in Japanese Application No. 2019-517320, dated Sep. 3, 2019, 8 pages (with English translation).
LG Electronics, "Discussion on Common Phase Compensation for above 6GHz," R1-166909, 3GPP TSG RAN WG1 Meeting #86, Gothenburg, Sweden, Aug. 22-26, 2016, 7 pages.
Nokia, Alcatel-Lucent Shanghai Bell, "Reference symbols types in NR," R1-167290, 3GPP TSG-RAN WG1#86, Gothenburg, Sweden, Aug. 22-26, 2016, 3 pages.
Nokia, Alcatel-Lucent Shanghai Bell, Verizon Wireless, "On PCRS Design for NR," R1-1610276, 3GPP TSG-RAN WG1 #86-Bis, Oct. 10-14, 2016, 9 pages.
United States Notice of Allowance in U.S. Appl. No. 15/780,087, dated May 28, 2019, 12 pages.
Verizon, "Verizon 5G TF; Air Interface Working Group; Verizon 5th Generation Radio Access; Physical channels and modulation (Release 1)", TS V5G.211 V1.3, Jun. 29, 2016, 79 pages.
Verizon, "Verizon 5G TF; Air Interface Working Group; Verizon 5th Generation Radio Access; Physical layer procedures (Release 1)", TS V5G.213 v1.0, Jun. 24, 2016, 43 pages.
European Office Action in European Appln. No. 17856828.3, dated Oct. 12, 2020, 6 pages.
Indian Office Action in Indian Application No. 201927010321, dated Aug. 17, 2020, 6 pages (with English translation).
Russian Notice of Allowance in Russian Application No. 2019111911, dated Dec. 2, 2019, 20 pages (with English translation).
Chinese Office Action in Chinese Application No. 201780047233.9, dated Mar. 5, 2020, 14 pages (with English translation).
Extended European Search Report in European Application No. 17856828.3, dated Jan. 27, 2020, 10 pages.

* cited by examiner

METHOD FOR RECEIVING CONTROL INFORMATION FOR REFERENCE SIGNAL RELATED TO PHASE NOISE ESTIMATION AND USER EQUIPMENT THEREFOR

CROSS-REFERENCE TO RELATED APPLICATIONS

This application is a continuation of U.S. application Ser. No. 16/381,529, filed on Apr. 11, 2019, now allowed, which is a continuation of U.S. application Ser. No. 15/780,087, filed on May 30, 2018, now allowed, which is a 35 USC § 371 National Stage entry of International Application No. PCT/KR2017/010956, filed on Sep. 29, 2017, and claims priority to U.S. Provisional Application No. 62/401,954, filed on Sep. 30, 2016, and U.S. Provisional Application No. 62/417,367, filed on Nov. 4, 2016, all of which are incorporated by reference in their entirety herein.

TECHNICAL FIELD

The present invention relates to a wireless communication system, and more particularly, to a method for receiving control information for a reference signal related to phase noise estimation and user equipment therefor.

BACKGROUND ART

In the next-generation 5G system, scenarios can be divided into Enhanced Mobile Broad Band (eMBB), Ultra-reliable Machine-Type Communications (uMTC), and Massive Machine-Type Communications (mMTC). The eMBB corresponds to a next-generation mobile communication scenario characterized by high spectrum efficiency, high user experienced data rate, high peak data rate, etc. The uMTC corresponds to a next-generation mobile communication scenario (e.g., V2X, emergency service, remote control, etc.) characterized by ultra-reliable and ultra-low latency, ultra-high availability, etc. The mMTC corresponds to a next-generation mobile communication scenario (e.g., IoT) characterized by low cost, low energy, short packet, massive connectivity, etc.

Disclosure of Invention Technical Problem

A technical task of the present invention is to provide a method performed by a user equipment for receiving control information for a reference signal related to phase noise estimation.

Another technical task of the present invention is to provide a user equipment for receiving control information for a reference signal related to phase noise estimation.

It will be appreciated by persons skilled in the art that the technical tasks that could be achieved with the present invention are not limited to what has been particularly described hereinabove and the above and other objects that the present invention could achieve will be more clearly understood from the following detailed description.

Solution to Problem

To achieve these and other advantages and in accordance with the purpose of the present invention, as embodied and broadly described, a method for receiving control information for a reference signal related to phase noise estimation by a user equipment (UE) comprises receiving control information indicating whether the reference signal related to the phase noise estimation is transmitted; when the control information indicates that the reference signal is transmitted, receiving the reference signal based on the control information; wherein when a size of a traffic resource block (RB) for the UE is greater than a predetermined value, the control information indicates the reference signal is transmitted.

The control information further includes information of a modulation and coding scheme (MCS) level, and wherein the information of the MCS level indicates in-formation on a time pattern of the reference signal. The control information further includes information of a size of traffic RB, and wherein the information of the MCS level and the information of the size of traffic RB indicate the information on the time pattern of the reference signal. The information on the time pattern of the reference signal includes information on a pattern of allocating the reference signal to time resources, and wherein the reference signal is allocated more densely to the time resources as the MCS level is more higher.

The control information further includes information of a size of traffic RB, and wherein information on a frequency pattern of the reference signal is indicated based on the information of the size of traffic RB. The information on the frequency pattern of the reference signal includes information on a pattern of allocating the reference signal to frequency resources, and wherein a number of reference signals on the frequency resources increases as the size of traffic RB size is more larger.

The control information further includes information of a modulation and coding scheme (MCS) level and information of a size of traffic RB, and further comprising recognizing locations of the reference signal in time and frequency domains based on the information of the MCS level and the information of the size of traffic RB.

The method further comprises estimating a phase error using the received reference signal. The reference signal includes a phase tracking reference signal (PT-RS). The control information is received through a downlink control information (DCI) format or radio resource control (RRC) signaling.

To further achieve these and other advantages and in accordance with the purpose of the present invention, a user equipment (UE) for receiving control information for a reference signal related to phase noise estimation, the UE comprises a receiver; and a processor, wherein the processor is configured to control the receiver to receive control information indicating whether the reference signal related to the phase noise estimation is transmitted and, when the control information indicates that the reference signal is transmitted, control the receiver to receive the reference signal based on the control information, and wherein when a size of a traffic resource block (RB) for the UE is greater than a predetermined value, the control information indicates the reference signal is transmitted.

The control information further includes information of a modulation and coding scheme (MCS) level, and wherein the information of the MCS level indicates in-formation on a time pattern of the reference signal. The control information further includes information of a size of traffic RB, and wherein the information of the MCS level and the information of the size of traffic RB indicate the information on the time pattern of the reference signal.

The control information further includes information of a size of traffic RB, and wherein information on a frequency pattern of the reference signal is indicated based on the information of the size of traffic RB. The information on the time pattern of the reference signal includes information on a pattern of allocating the reference signal to time resources, and wherein the reference signal is allocated more densely to the time resources as the MCS level is more higher. The information on the frequency pattern of the reference signal includes information on a pattern of allocating the reference signal to frequency resources, and wherein a number of reference signals on the frequency resources increases as the size of traffic RB is more larger.

The control information further includes information of a modulation and coding scheme (MCS) level and information on a size of traffic RB, and wherein the processor is configured to recognize location of the reference signal in time and frequency domains based on the information on the MCS level and the information of the size of traffic RB.

The processor is further configured to estimate a phase error using the received reference signal. The reference signal includes a phase tracking reference signal (PT-RS). The receiver is configured to receive the control information through a downlink control information (DCI) format or radio resource control (RRC) signaling.

Advantageous Effects of Invention

According to the present invention, communication performance can be considerably improved by estimating a phase noise based on a reference signal related to phase noise estimation proposed in the present invention in an environment where the performance is significantly degraded due to the phase noise.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR CARRYING OUT THE INVENTION

Figure 1:
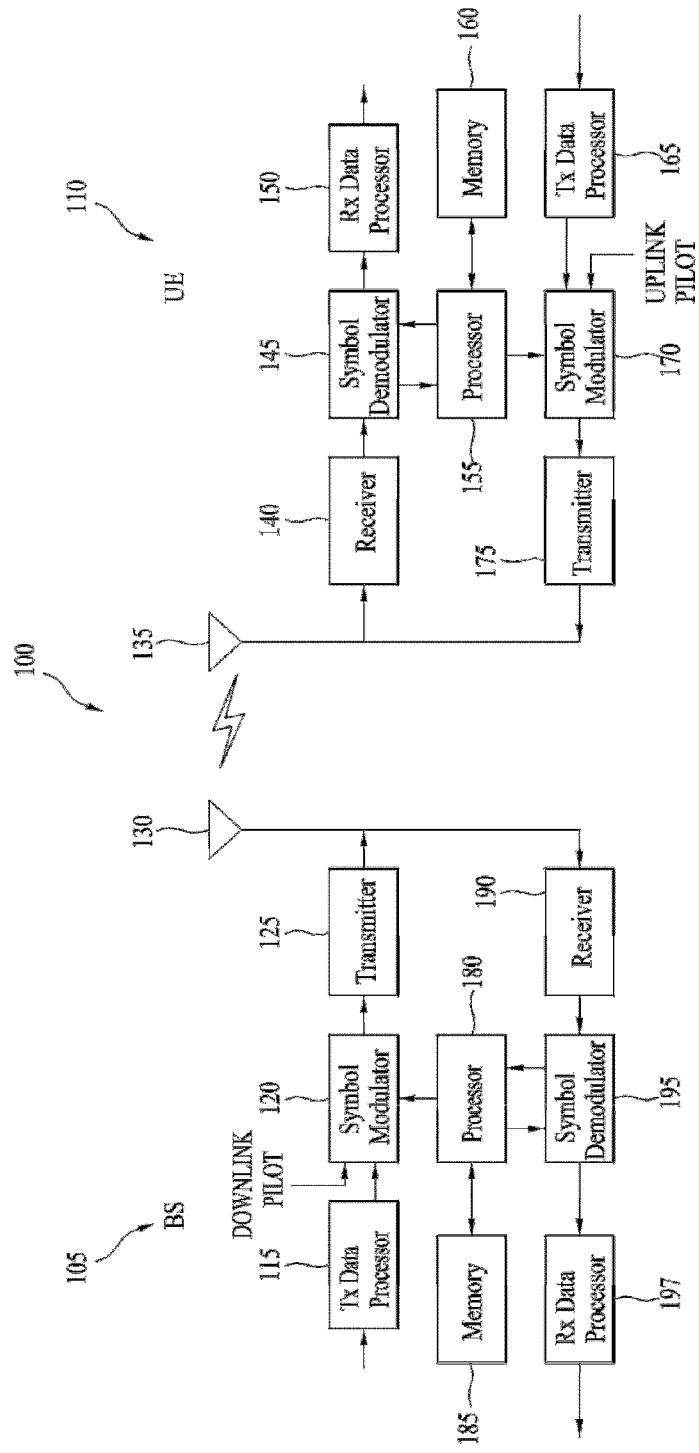
FIG. 1 is a block diagram illustrating configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full under-standing of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE/LTE-A system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution).

OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140.

The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then re-constructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a micro-processor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
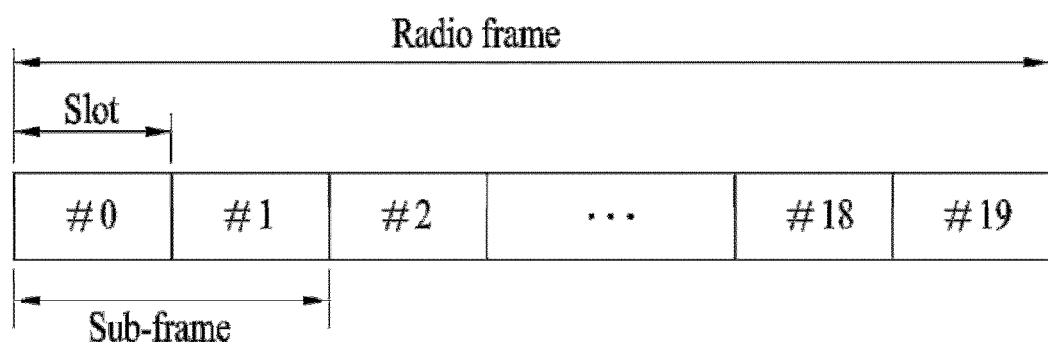
FIG. 2 is a diagram illustrating a frame structure used in the LTE/LTE-A system.

FIG. 2 is a diagram illustrating a frame structure used in the LTE/LTE-A system.

Referring to FIG. 2, one frame has a length of 10 ms and includes 10 subframes each having a length of 1 ms. A time required for transmitting one subframe can be defined as a transmission time interval (TTI). For example, one subframe includes 2 slots each having a length of 0.5 ms, and each slot includes 7 (or 6) orthogonal frequency division multiplexing (OFDM) symbols. The 3GPP LTE system adopts OFDMA in downlink and the OFDM symbol indicates one symbol period. The OFDM symbol may be referred to as an SC-FDMA symbol or a symbol period. As a resource allocation unit, a resource block (RB) includes a plurality of subcarriers which are adjacent to a slot. The radio frame structure illustrated in FIG. 2 is merely exemplary, and various modifications may be made in the number of subframes included in a radio frame, the number of slots included in a subframe, or the number of OFDM symbols included in a slot.

One RB is defined by 12 subcarriers having a spacing of 15 kHz and 7 OFDM symbols. A BS transmits a primary synchronization signal (PSS) and a secondary synchronization signal (SSS) for synchronization and a physical broadcast channel (PBCH) in 6 RBs at the center frequency. In this case, depending on a normal/extended cyclic prefix (CP) and time division duplex/frequency division duplex (TDD)/(FDD), the radio frame structure, signals, and channel locations may be changed.

Figure 3:
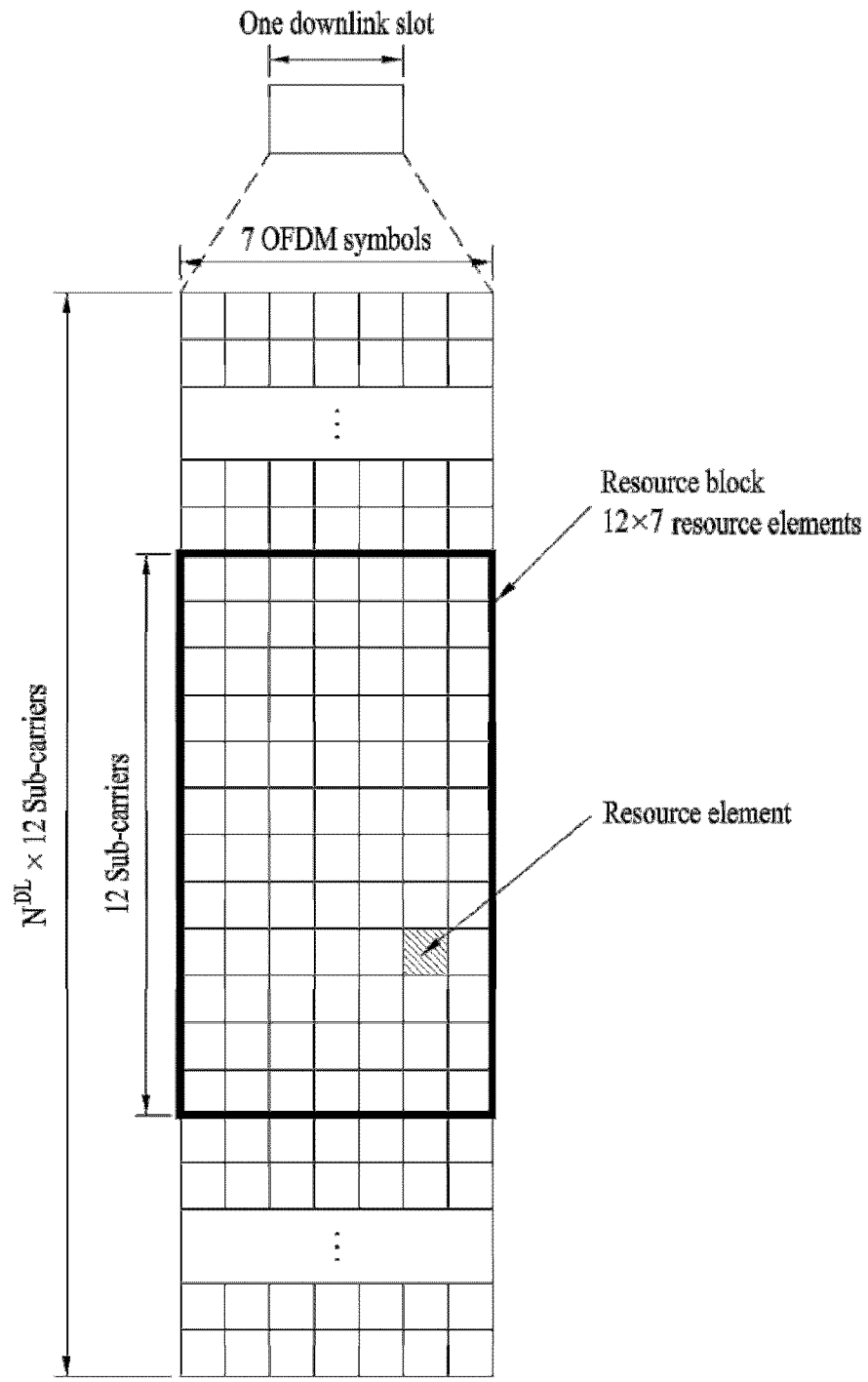
FIG. 3 is a diagram illustrating a resource grid of a downlink slot of the 3GPP LTE/LTE-A system as an example of the wireless communication system.

FIG. 3 is a diagram illustrating a resource grid of a downlink slot of the 3GPP LTE/LTE-A system as an example of the wireless communication system.

Referring to FIG. 3, the downlink slot includes a plurality of OFDM symbols in the time domain. One downlink slot includes 7 (or 6) OFDM symbols, and an RB may include 12 subcarriers in the frequency domain. Each element in the resource grid is referred to as a resource element (RE). One RB includes 12×7 (or 6) REs. The number NRB of RBs included in the downlink slot depends on a downlink transmission band. The structure of an uplink slot is identical to that of the downlink slot except that an OFDM symbol is replaced with an SC-FDMA symbol.

Figure 4:
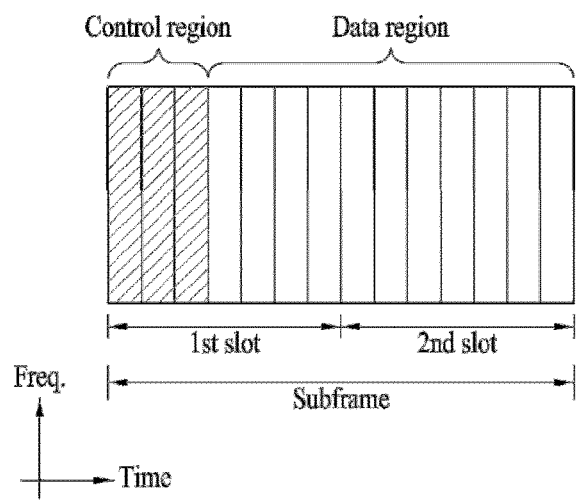
FIG. 4 illustrates a structure of a downlink subframe of the 3GPP LTE/LTE-A system as an example of the wireless communication system.

FIG. 4 is a diagram showing the structure of a downlink subframe used in a 3GPP LTE/LTE-A system which is an example of a wireless communication system.

Referring to FIG. 4, a maximum of three (four) OFDM symbols located in a front portion of a first slot within a subframe corresponds to the control region to which a control channel is allocated. The remaining OFDM symbols correspond to the data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted on a first OFDM symbol of a subframe and carries information regarding the number of OFDM symbols used for transmission of control channels within the subframe. The PHICH is a response to uplink transmission and carries a HARQ acknowledgment (ACK)/negative acknowledgment (NACK) signal.

Control information carried on the PDCCH is called downlink control information (DCI). As a DCI format, format 0 for uplink and formats 1, 1A, 1B, 1C, 1D, 2, 2A, 3 and 3A for downlink are defined. The DCI format selectively includes a hopping flag, RB allocation, modulation coding scheme (MCS), redundancy version (RV), new data indicator (NDI), transmit power control (TPC), cyclic shift demodulation reference signal (DMRS), channel quality information (CQI) request, HARQ process number, transmitted precoding matrix indicator (TPMI), precoding matrix indicator (PMI) confirmation, etc. according to usage thereof.

The PDCCH may deliver information about resource allocation and a transport format for a Downlink Shared Channel (DL-SCH), information about resource al-location and a transport format for an Uplink Shared Channel (UL-SCH), paging in-formation of a Paging Channel (PCH), system information on the DL-SCH, in-formation about resource allocation for a higher-layer control message such as a random access response transmitted on the PDSCH, a set of Tx power control commands for individual UEs of a UE group, a Tx power control command, Voice Over Internet Protocol (VoIP) activation indication information, etc. A plurality of PDCCHs may be transmitted in the control region. The UE may monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). The format of the PDCCH and the number of PDCCH bits are determined according to the number of CCEs. The base station determines a PDCCH format according to DCI to be transmitted to the UE and attaches cyclic redundancy check to control information.

The CRC is masked by a unique Identifier (ID) (e.g. a Radio Network Temporary Identifier (RNTI)) according to the owner or usage of the PDCCH. If the PDCCH is destined for a specific UE, the CRC may be masked by an ID (e.g. a cell-RNTI (C-RNTI)) of the UE. If the PDCCH carries a paging message, the CRC may be masked by a paging ID (e.g. a Paging-RNTI (P-RNTI)). If the PDCCH carries system information, particularly, a System Information Block (SIB), the CRC may be masked by a system information ID (e.g. a System Information RNTI (SI-RNTI)). If the PDCCH is for a random access response, the CRC may be masked by a Random Access-RNTI (RA-RNTI).

Figure 5:
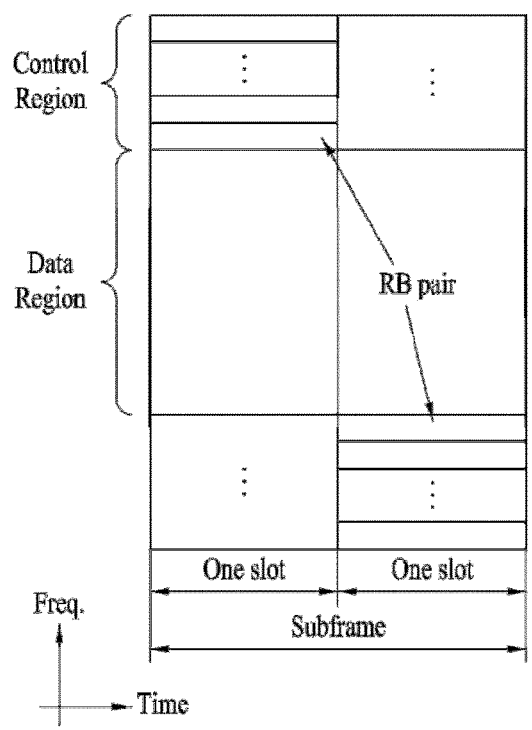
FIG. 5 illustrates a structure of an uplink subframe used in the 3GPP LTE/LTE-A system as an example of the wireless communication system.

FIG. 5 is a diagram showing the structure of an uplink subframe used in a 3GPP LTE/LTE-A system which is an example of a wireless communication system.

Referring to FIG. 5, the UL subframe includes a plurality (e.g., two) of slots. The slot may include SC-FDMA symbols, the number of which is changed according to CP length. The UL subframe is divided into a control region and a data region in the frequency domain. The data region includes a physical uplink shared channel (PUSCH) and is used to transmit a data signal such as voice. The control region includes a physical uplink control channel (PUCCH) and is used to transmit uplink control information (UCI). The PUCCH includes an RB pair located at both ends of the data region on the frequency axis and hops over a slot boundary.

The PUCCH can be used to transmit the following control information.

Scheduling Request (SR): This is information used to request a UL-SCH resource and is transmitted using an On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword (CW) and a 2-bit ACK/NACK signal is transmitted as a response to two downlink codewords.

Channel Quality Indicator (CQI): This is feedback information about a downlink channel. Feedback information regarding MIMO includes a rank indicator (RI), a precoding matrix indicator (PMI), a precoding type indicator (PTI), etc. 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports seven formats according to information transmitted thereon.

Physical Downlink Control Channel (PDCCH) Transmission

As a downlink control channel, the PDCCH is configured to carry a power control command for a specific UE. The PDCCH occupies up to 4 OFDM symbols in the time domain and a PCFICH is used to indicate the number of OFDM symbols allocated to the PDCCH. Meanwhile, in the frequency domain, the PDCCH is transmitted over the full system bandwidth, and QPSK is used for modulation. A resource used for PDCCH transmission is referred to as a control channel element (CCE). Each CCE includes 36 REs, and thus 72 bits can be transmitted through a single CCE. The amount of control information used for the PDCCH transmission depends on a transmission mode.

Control information according to each transmission mode is regulated according to DCI formats. Meanwhile, based on a PDCCH decoding result, a UE determines whether a PDSCH/PUSCH is transmitted. This is because PDCCH scrambling is achieved by UE ID information (e.g., C-RNTI) of the corresponding UE. In other words, when the UE detects a DCI format scrambled with its UE ID, the UE performs PDSCH reception or PUSCH transmission based on PDCCH control information.

Since in general, a number of PDCCHs can be transmitted in one subframe, a UE should check whether there is control information transmitted to the corresponding UE by decoding a number of the PDCCHs. However, if the UE needs to decode all PDCCHs that can be transmitted, complexity is significantly increased. Thus, there is limitation on the number of times of decoding. When control information is transmitted through the PDCCH, the control information can be transmitted through a single CCE or aggregation of multiple CCEs. This is referred to as CCE aggregation. In the current system, CCE aggregation levels 1, 2, 4, and 8 are allowed, and the CCE aggregation level 4 means that control information for a UE is transmitted through aggregation of 4 CCEs.

Phase Noise Analysis and Phase Tracking RS (PTRS) Design

Phase Noise

Figure 6:
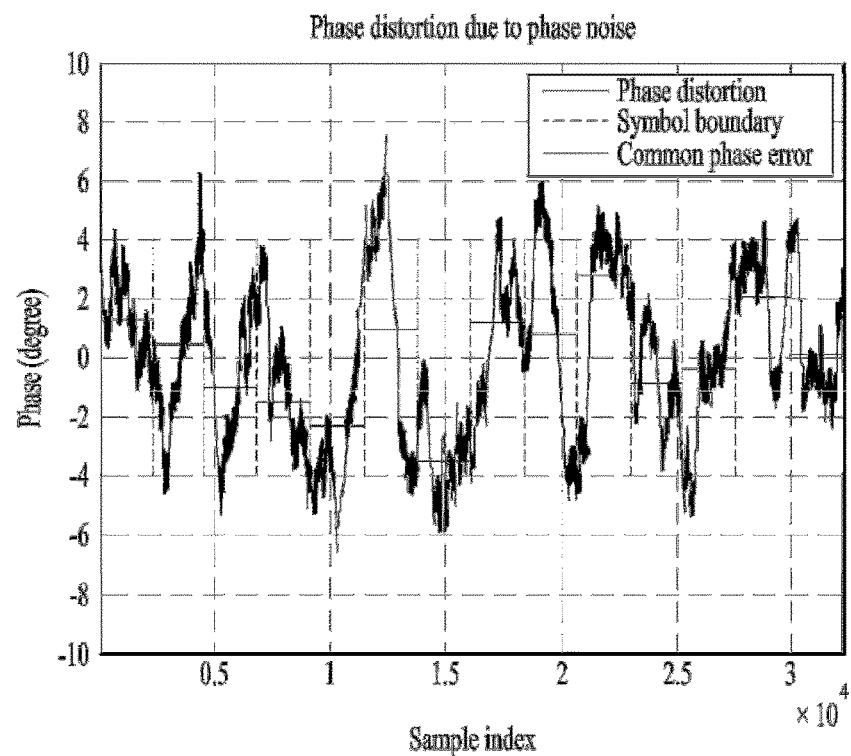
FIG. 6 illustrates Phase distortion due to phase noise.

FIG. 6 illustrates Phase distortion due to phase noise.

PN (Phase Noise) is defined as the noise arising from the short-term random fluctuation in the phase of a waveform. The PN corrupts received signal in the time domain to rotate its phase randomly, which is shown in FIG. 6. Here, it can be seen that the PN changes randomly but it shows correlation between adjacent time samples, which results in CPE (Common Phase Error) and ICI (Inter Carrier Interference) to received signal in the frequency domain. Namely, CPE and ICI indicate correlation and randomness of PN in an OFDM symbol, respectively.

Figure 7:
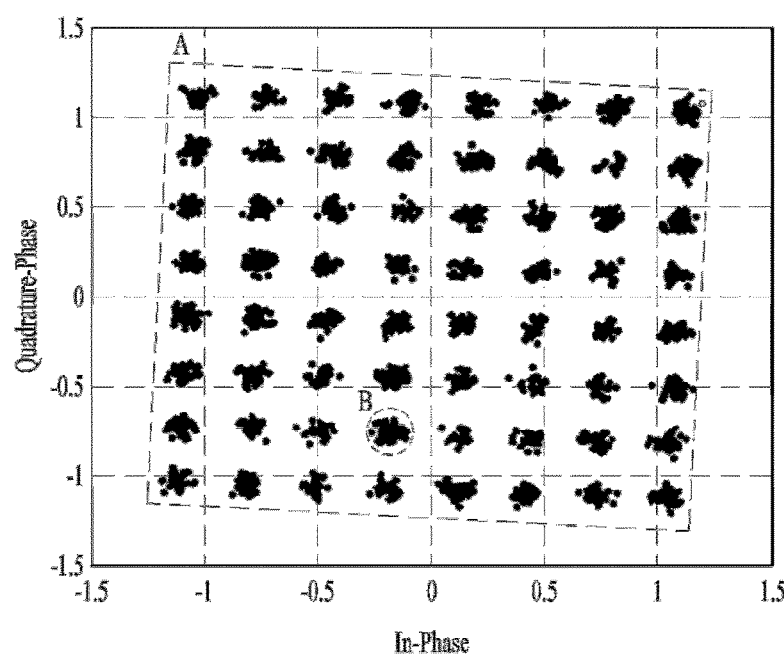
FIG. 7 illustrates constellation of received symbols corrupted by phase noise.

FIG. 7 illustrates constellation of received symbols corrupted by phase noise.

FIG. 7 shows the effect of CPE and ICI on received constellation points without noise. It can be seen that for square 'A', all constellation points are rotated in 3 degree, which results from CPE. In addition, for the circle 'B', constellation points are randomly placed in the circle, which results from ICI.

We introduce that potential gain of CPE compensation. In what follows, we define a new tracking reference signal for CPE estimation as PTRS (Phase Tracking Reference Signal) (or PT-RS), and show evaluation results on PTRS in the evaluation result section.

Evaluation Results

In this section, we adopt PN models. Also, Table 1 shows simulation setup, and all simulation results follow that unless otherwise stated.

TABLE 1

| | | | |
|---|---|---|---|
| PN Model | PN model 2 in [2] | CFO | 0 kHz |
| Carrier Frequency | 30 GHz | number (#) of Traffic RBs | 4/64 |
| Subcarrier Spacing | 60 kHz | number (#) of System RBs | 100 |
| Channel | TDL-B(30 ns, 0 km/h) | Modulation | 64 QAM |
| Channel Estimation | Ideal | Code Rate | 5/6 |
| CPE Estimation | Real | | |

PTRS Density in the Frequency Domain

Figure 8:
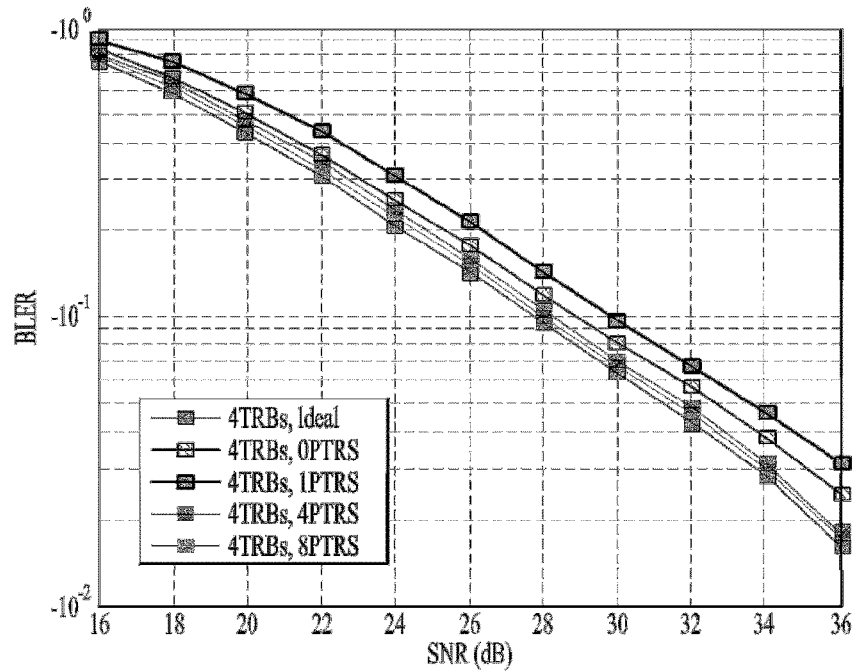
FIG. 8 illustrates BLER performance for different PTRS frequency densities and 4 TRBs.
Figure 9:
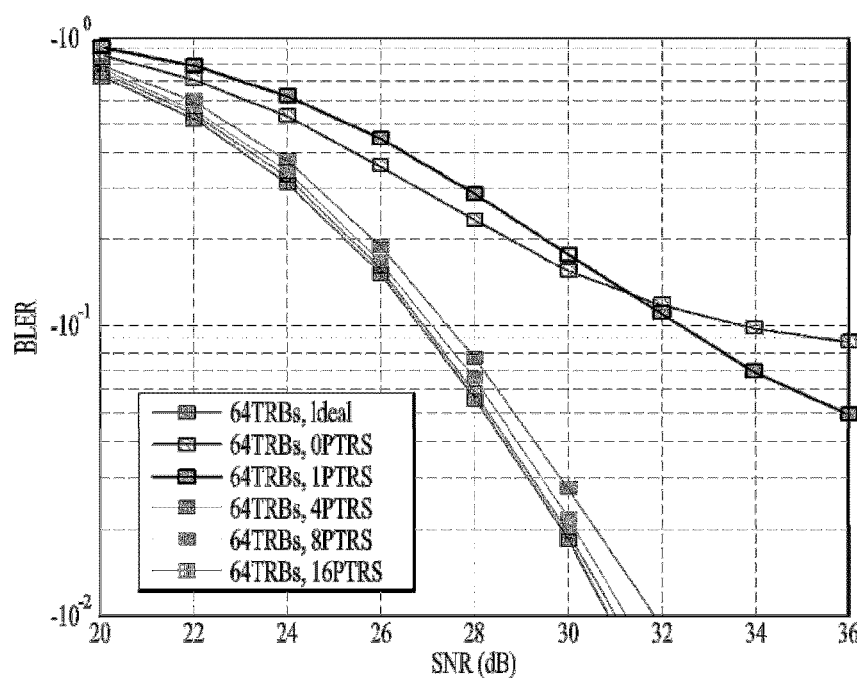
FIG. 9 illustrates BLER performance for different PTRS frequency densities and 64 TRBs.

FIG. 8 illustrates BLER performance for different PTRS frequency densities and 4 TRBs. FIG. 9 illustrates BLER performance for different PTRS frequency densities and 64 TRBs.

FIG. 8 and FIG. 9 show BLER performance according to PTRS frequency density (0/1/4/8/16) in an OFDM symbol. Here, "PTRS=0" and "Ideal" represent non CPE compensation, and ideal CPE compensation, respectively.

In these FIGS. 8 and 9, we can see that BLER performance gap according to PTRS frequency density is much higher as TRB size is larger. Especially, FIG. 8 shows non CPE compensation has 1 dB BLER performance degradation compared to CPE compensation with PTRS=8, while FIG. 9 displays that the former case has 5.8 dB performance degradation than the latter case.

Meanwhile, we can observe that the BLER performance is improved as number (#) of PTRS increases, and BLER performance of ideal CPE compensation can be achieved with slightly performance loss when number (#) of PTRS is equal to or higher than 4. In other words, 4 or 8 PTRS is enough for CPE estimation regardless of TRB size.

Observation 1: BLER performance gap according to PTRS frequency density is much higher as TRB size is larger.

Observation 2: 4 or 8 PTRS is enough for CPE estimation regardless of # of TRB.

PTRS density in the time domain

Figure 10:
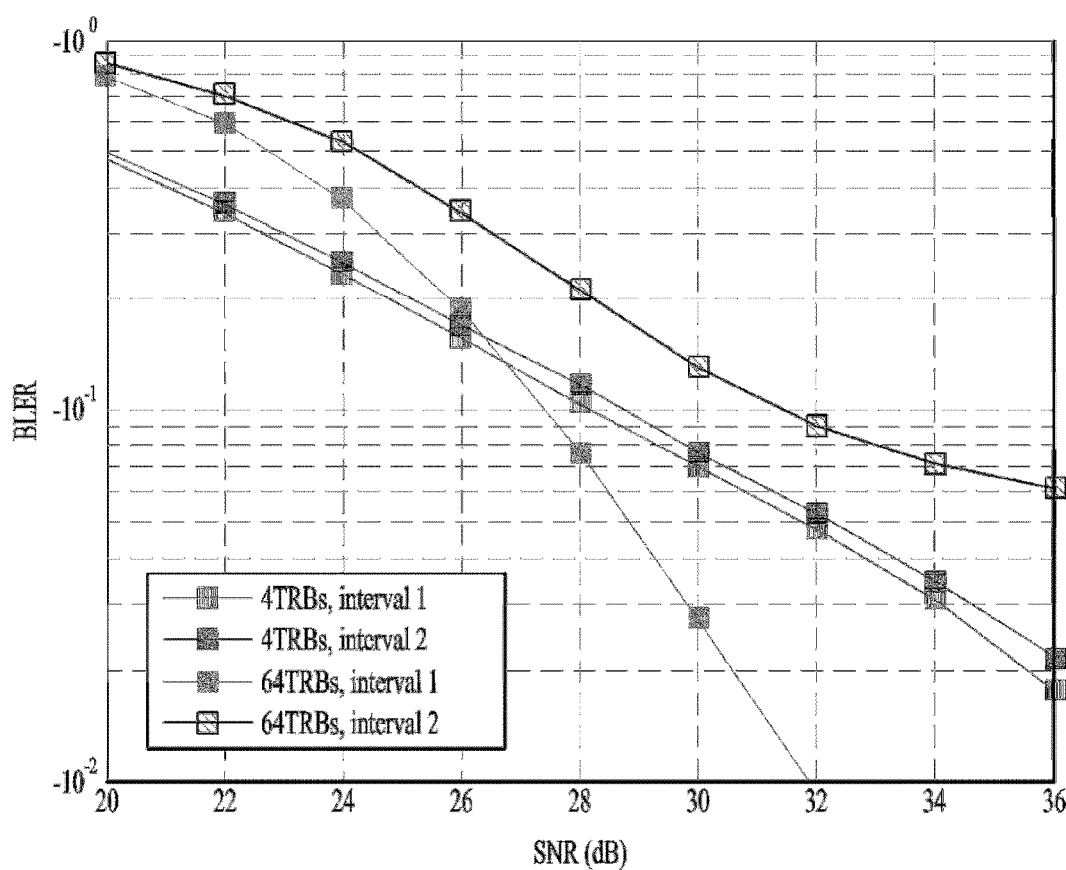
FIG. 10 illustrates BLER performance for different time densities and 4/64 TRBs.

FIG. 10 illustrates BLER performance for different time densities and 4/64 TRBs.

FIG. 10 displays BLER performance according to PTRS interval (1/2) in the time domain. Here, # of PTRS in an OFDM symbol is equal to 4.

Similar to evaluation results in FIG. 8 and FIG. 9, it can also be seen that BLER performance gap according to PTRS time density is much higher as TRB size is larger. Especially, for PTRS interval 2 in 64 TRBs, significant performance degradation is observed. In contrast, for 4 TRBs, PTRS interval 2 shows 0.6 dB performance degradation compared to interval 1 at BLER=0.1.

Observation 3: BLER performance gap according to PTRS time density is much higher as TRB size is larger.

Throughput for different PTRS frequency/time densities

Figure 11:
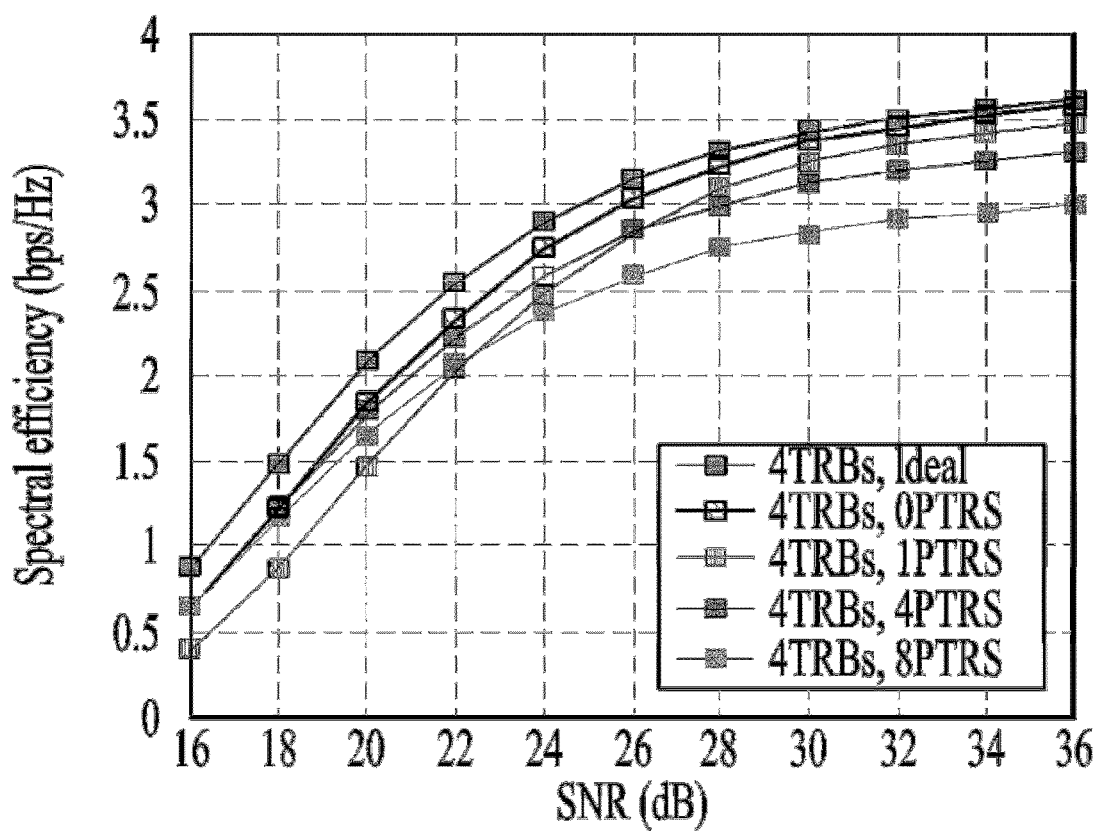
FIG. 11 illustrates spectral Efficiency for different PTRS frequency densities and 4 TRBs.

FIG. 11 illustrates spectral Efficiency for different PTRS frequency densities and 4 TRBs.

In FIG. 11, we observe for TRB=4 that non CPE compensation has better spectral efficiency than CPE compensation with any PTRS number. This is due to the fact that for TRB=4, only single codeblock is defined in a codeword, and it spreads out in the subframe, which relieves phase noise impact. For this reason, FIG. 3 shows that BLER performance is not severely degraded even for non CPE compensation. In addition, its information size is larger than the cases of CPE compensation, because PTRS is not defined in the data region. As a result, we can see that for TRB=4, throughput loss due to PTRS is larger than performance gain coming from CPE compensation. PT-RS can be on/off according to RB size. For example, the PT-RS may be not transmitted when the RB size is smaller than predefined threshold size, the PT-RS may be transmitted when the RB size is equal to or larger than the predefined threshold size. For this case, the RB size may be a size of scheduled RB or scheduled bandwidth (BW).

Figure 12:
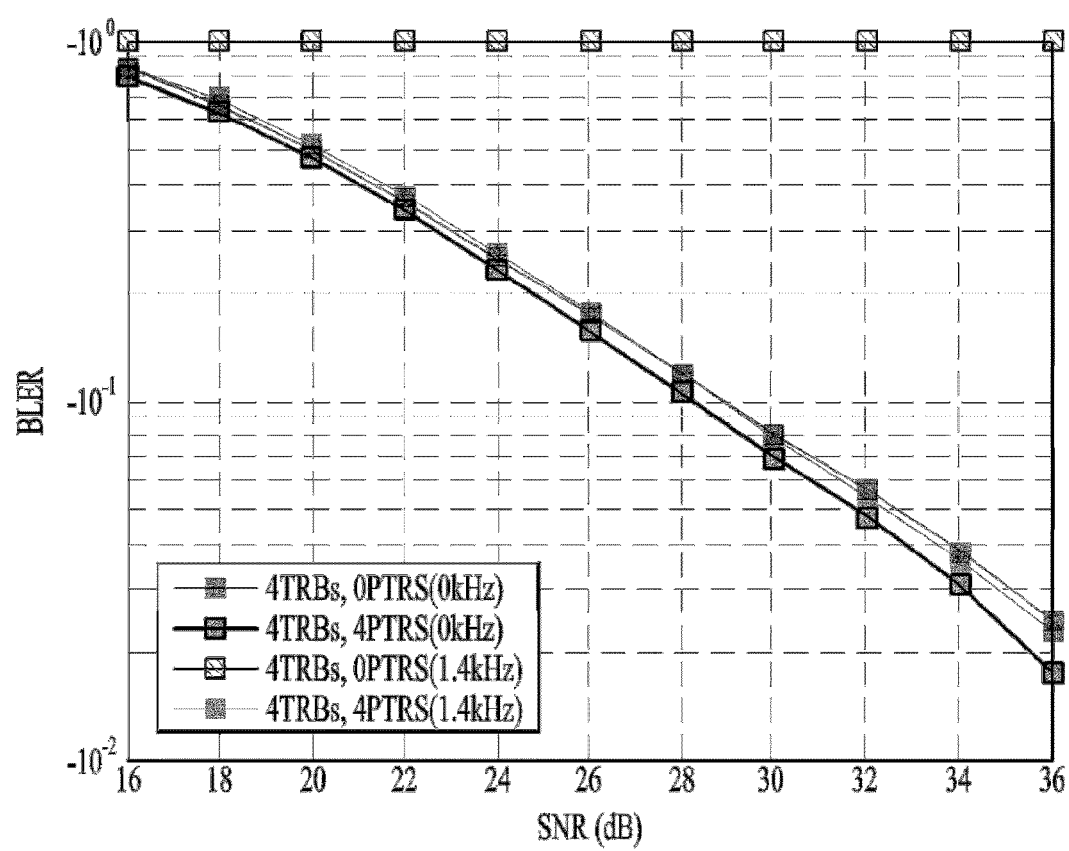
FIG. 12 illustrates BLER performance for CFO=0 kHz/1.4 kHz.

FIG. 12 illustrates BLER performance for CFO=0 kHz/ 1.4 kHz.

Nevertheless, PTRS would be needed for even small TRB, since CFO (Carrier Frequency Offset) due to local oscillator and Doppler should be taken into account with phase noise. Actually, FIG. 12 shows that non CPE compensation produces BLER=1, while CPE compensation with CFO=1.4 kHz shows 0.6 dB performance degradation compared to that with CFO=0 kHz. Note that evaluation assumption indicates that CFO at UE is uniformly distributed in [−0.1, 0.1] ppm, and for 30 GHz, its maximum CFO is equal to 3 kHz. Accordingly, PTRS should be necessary for 4 TRB, and therefore, the trade-off between performance gain coming from CPE compensation and PTRS overhead should be considered.

Observation 4: For 4 TRBs, non CPE compensation has better spectral efficiency than CPE compensation.

Proposal 1: The trade-off between performance gain from CPE compensation and PTRS overhead should be considered.

Meanwhile, CPE estimation using PTRS is the same as CFO estimation, which has been extensively studied for many years. Especially, (semi) blind technique can provide CFO estimate without pilots, which can minimize throughput loss due to pilots. In this case, blind CPE estimation could be beneficial for small TRB size. As a result, (semi) blind CPE estimation needs to be studied.

Proposal 2: (Semi) Blind CPE estimation needs to be studied for small TRB size.

Figure 13:
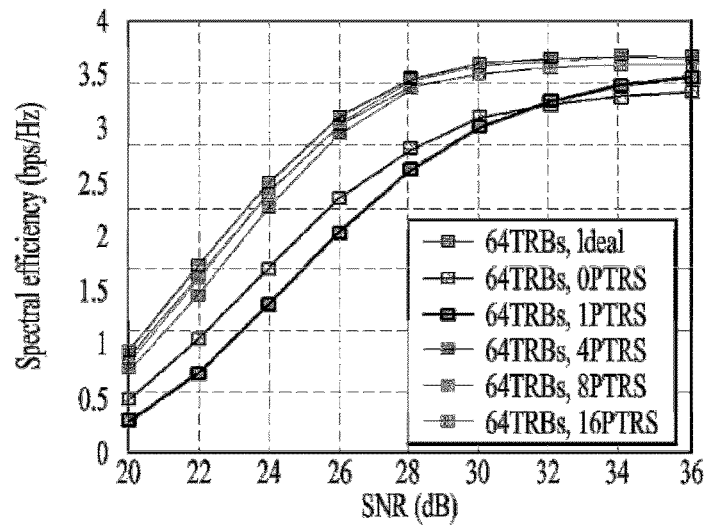
FIG. 13 illustrates Spectral Efficiency for different PTRS frequency densities and 64 TRBs.

FIG. 13 illustrates Spectral Efficiency for different PTRS frequency densities and 64 TRBs.

In contrast, in FIG. 13, we can see for TRB=64 that CPE compensation achieves much higher spectral efficiency than non CPE compensation. This is because for TRB=64, several codeblocks are defined in a codeword, and each codeblock spreads out in one or two OFDM symbol(s). If there is higher phase noise in a specific OFDM symbol, the codeblock located in the OFDM symbol has higher failure probability.

Actually, it can also be checked from FIG. 4 and FIG. 5 that for TRB=64, non CPE compensation or PTRS interval=2 shows significantly degraded BLER performance.

On the other hand, observation 2 indicates that RS overhead becomes small as TRB size increases. Accordingly, for large TRB size, CPE should be compensated.

Observation 5: For 64 TRBs, CPE compensation except for PTRS=1 has better spectral efficiency than non CPE compensation.

Figure 14:
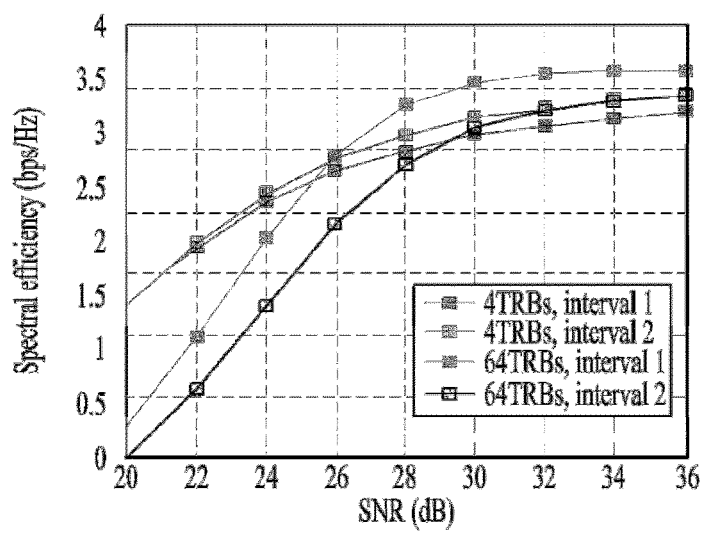
FIG. 14 illustrates Spectral Efficiency for different PTRS time densities and 4/64 TRBs.

FIG. 14 illustrates Spectral Efficiency for different PTRS time densities and 4/64 TRBs.

Similarly, FIG. 14 also shows that for TRB=4, PTRS time interval 2 achieves higher spectral efficiency than interval 1, while for TRB=64, interval 1 has better spectral efficiency interval 2.

Observation 6: For TRB=4, PTRS time interval 2 achieves higher spectral efficiency than time interval 1. In contrast, for TRB=64, PTRS time interval 1 achieves higher spectral efficiency than time interval 2.

FIG. 11, FIG. 13, FIG. 14 show the spectral efficiency for different number (#) of RBs and PCRS density in time/frequency domain.

Proposal 3: PTRS time interval should be designed flexibly according to TRB size.

Frequency and Time First Mapping Rule

Figure 15:
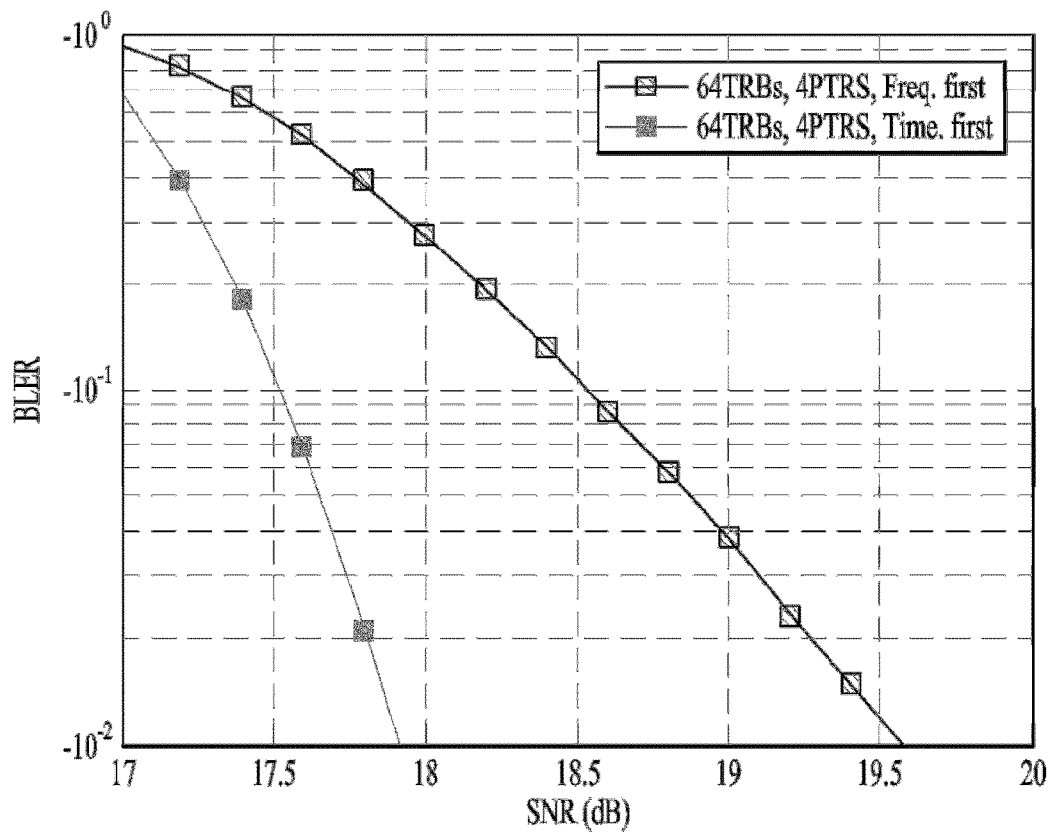
FIG. 15 illustrates frequency/Time first mapping.

FIG. 15 illustrates frequency/Time first mapping.

FIG. 15 shows BLER performance for both frequency first mapping and time first mapping. Here, we adopt AWGN channel, 4 PTRS and MCS #26.

In FIG. 15, it can be seen that time first mapping shows better BLER performance compared to frequency first mapping even for CPE compensation. This improvement comes from that ICI and residual CPE impacts are relieved by spreading codeblock out in the time domain. Along with observation 4, this evaluation results clearly show that codeblock spreading in the time domain is effective way to reduce phase noise impact.

Observation 7: Codeblock spreading in the time domain reduces phase noise impact even for CPE compensation.

Proposal 4: Codeblock spreading in the time domain would be considered. [131] Inter-CB (Code Block) interleaving In case of the conventional LTE technology, after rate matching defined on a code block basis, bits for each code block are concatenated in order of code blocks and bits in each code block. Table 2 below shows the definition of the code block con-catenation defined in 3GPP TS 36.212.

TABLE 2

```
Set k = 0 and r = 0
while r < C
    Set j = 0
    while j < E_r
        f_k = e_rj
        k = k + 1
        j = j + 1
    end while
    r = r + 1
end while
```

5.1.5 Code Block Concatenation

The input bit sequence for the code block concatenation block are the sequences $e_{rk}$, for r=0, . . . , C−1 and k=0, . . . , $E_r$−1. The output bit sequence from the code block concatenation block is the sequence $f_k$ for k=0, . . . , G−1.

The code block concatenation consists of sequentially concatenating the rate matching outputs for e different code blocks. Therefore, In Table 2, C, $E_r$, and G respectively indicate a code block number, an output bit number of an $r^{th}$ code block after rate matching, and a total bit number that can be transmitted through one transport block. In TS 36.212, a method for mapping bits to resource elements after arranging the bits according to the above-described code block concatenation scheme is defined as follow. The mapping to resource elements (i,j) on antenna port p not reserved for other purposes shall be in increasing order of first the index k over the assigned physical resource blocks and then the index k, starting with the first slot in a subframe. Here, k and l respectively indicate a subcarrier index and an OFDM symbol index. That is, since modulation is performed in order of code blocks and corresponding symbols are sequentially mapped to resource elements according to the above-described mapping scheme, it is impossible to obtain a channel coding gain through bits between code blocks. In this case, if the number of OFDM symbols occupied by one code block is decreased as the number of traffic RBs is increased, overall performance (e.g., BLER) may be degraded because an appropriate coding gain is not achieved in a situation that many errors occur in a specific OFDM symbol of received symbols. To overcome this performance degradation, interleaving can be performed between bits of code blocks.

Embodiment-1

As an embodiment, a method for performing inter-CB interleaving in the code block concatenation can be considered.

Inter-CB Interleaving for all Code Blocks

Table 3 below shows an example of 1-bit by 1-bit inter-CB interleaving for all code blocks.

TABLE 3

```
Set k = 0 and j = 0
while j < E_max
    Set r = 0
    while r < C
        if j < E_r
            f_k = e_rj
            k = k + 1
        end if
        r = r + 1
    end while
    j = j + 1
end while
```

Variables in Table 3 have the same meaning as those in Table 2. However, a newly defined variable, $E_{max}$, means a maximum value of $E_r$ that indicates a bit number for each code block after rate matching. The above equation is an example of performing interleaving on bits of all code blocks one bit by one bit. The following drawing shows an example of interleaving according the above equation.

Figure 16:
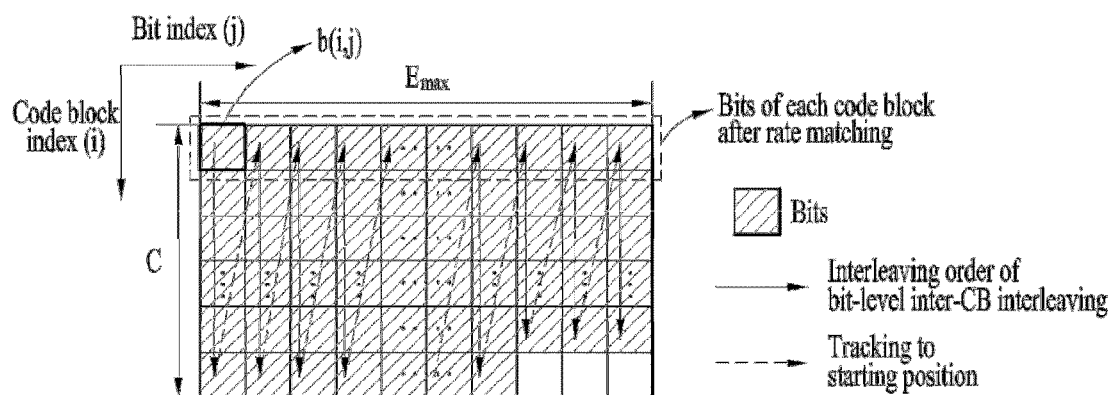
FIG. 16 is a diagram illustrating an example of inter-CB interleaving for an entire code book (1-bit by 1-bit)
Figure 17:
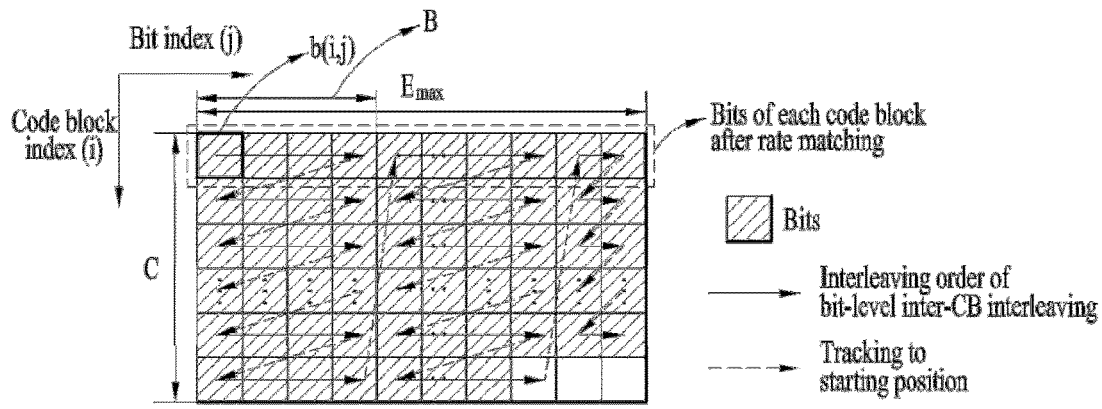
FIG. 17 is a diagram illustrating an example of inter-CB interleaving for the entire code book (B-bit by B-bit).

FIG. 16 is a diagram illustrating an example of inter-CB interleaving for an entire code book (1-bit by 1-bit), and FIG. 17 is a diagram illustrating an example of inter-CB interleaving for the entire code book (B-bit by B-bit).

In FIGS. 16 and 17, i and j respectively mean a code block index and a bit index, and b(i,j) means a $j^{th}$ bit of an $i^{th}$ code block. The Equation in Table 4 below shows an example of interleaving bits on a B-bit basis corresponding to a specific value.

TABLE 4

```
Set k = 0 and j = 0
while j < ⌈E_max/B⌉
    Set r = 0
    while r < C
        Set l = 0
        while l < B
            Set t = B × j + 1
            if t < E_r
                f_k = e_rt
                k = k + 1
            end if
```

TABLE 4-continued

```
        l = l + 1
      end while
      r = + 1
    end while
    j = j + 1
  end while
```

Inter-CB Interleaving for Code Block Group

Since in the case of inter-CB interleaving for all code block, the interleaving is performed on all code blocks, there may a problem such as decrease in a decoding rate. Thus, if all code blocks are divided into several groups and the inter-CB interleaving is performed in each group, the decrease in the decoding rate may be mitigated. The equation in Table 5 below shows an example of 1-bit by 1-bit inter-CB interleaving for a code block group including Q code blocks.

TABLE 5

```
Set k = 0 and n = 0
while n < [C/Q]
  Set j = 0
  while j < E_max
    Set r = 0
    while r < Q
      Set l = Q × n + r
      if j < E_r
        f_k = e_lj
        k = k + 1
      end if
      r = r + 1
    end while
    j = j + 1
  end while
  n = n + 1
end while
```

The equation in Table 5 corresponds to an example of interleaving bits of all code blocks one bit by one bit.

Figure 18:
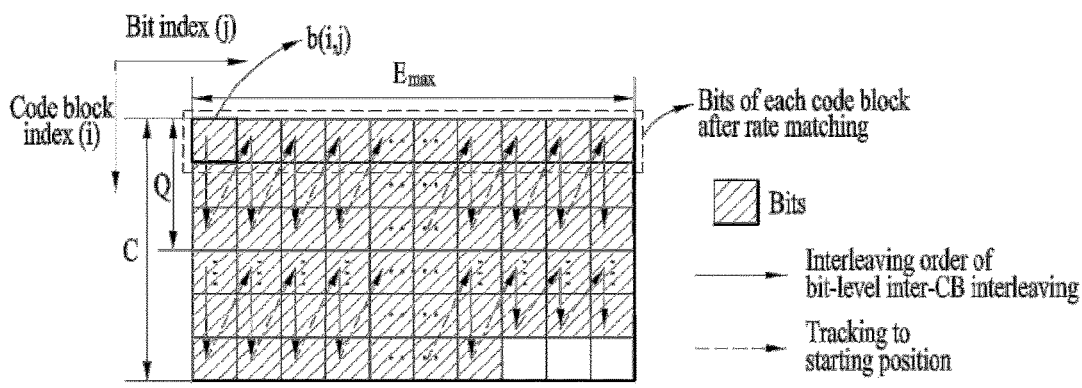
FIG. 18 is a diagram illustrating an example of inter-CB interleaving for a code block group (1-bits by 1-bits)

FIG. 18 shows an example of interleaving according to the equation in Table 5.

Figure 19:
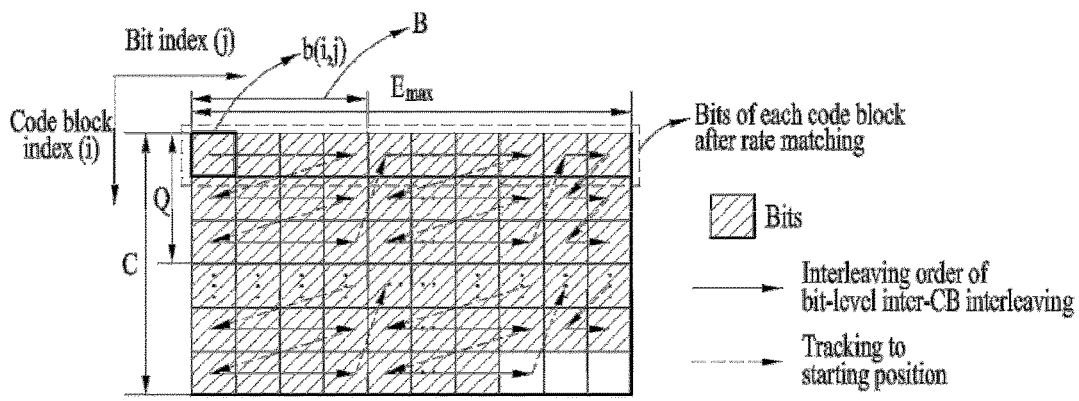
FIG. 19 is a diagram illustrating an example of inter-CB interleaving for the code block group (B-bits by B-bits).

FIG. 18 is a diagram illustrating an example of inter-CB interleaving for a code block group (1-bits by 1-bits), and FIG. 19 is a diagram illustrating an example of inter-CB interleaving for a code block group for the code block group (B-bits by B-bits). The equation in Table 6 below shows an example of interleaving bits on a B-bit basis corresponding to a specific value.

TABLE 6

```
Set k = 0 and n = 0
while n < [C/Q]
  Set j = 0
  while j < [E_max/B]
    Set r = 0
    while r < Q
      Set l = Q × n + r
      if l < C
        Set m = 0
        while m < B
          Set t = B × j + m
          if t < E_r
            f_k = e_lt
            k = k + 1
          end if
          m = m + 1
        end while
      end if
      r = r + 1
    end while
```

TABLE 6-continued

```
      j = j + 1
    end while
    n = n + 1
  end while
```

When the inter-CB interleaving is performed on a code block group basis as shown in the above example, a receiving end can perform decoding after receiving all code blocks in a code block group. In this case, a CRC for each code block in the code block group can be defined on the code block group basis. That is, it is possible to mitigate a loss caused by additional CRC bits by defining the CRC on the code block group basis rather than the code block basis as in the related art.

Embodiment-2

As another embodiment, it is possible to perform interleaving between code blocks in a process immediately after a code block concatenation block during the above-described procedure. In this case, the interleaving may be performed in the same or similar manner as described in the aforementioned embodiment.

Embodiment-3

As a further embodiment, it is possible to perform symbol-level interleaving between code blocks in a process immediately after a modulation block during the above-described procedure. In this case, the interleaving is performed on a modulated symbol basis. In the case of interleaving between modulation symbols, the interleaving may be performed on all modulation symbols or modulation symbols in each code block group.

Symbol-Level Inter-CB Interleaving for all Code Blocks

Figure 20:
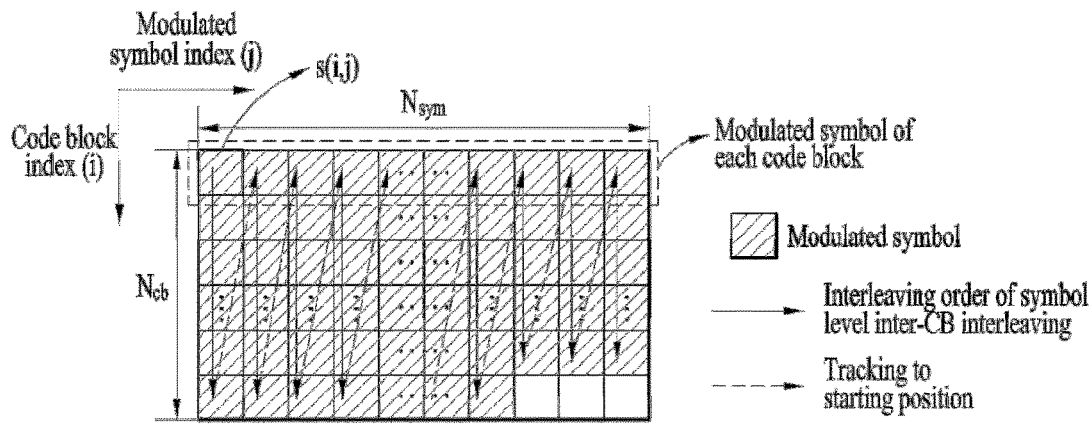
FIG. 20 is a diagram illustrating an example of symbol-level inter-CB interleaving for all code blocks (1-symbol by 1-symbol)
Figure 21:
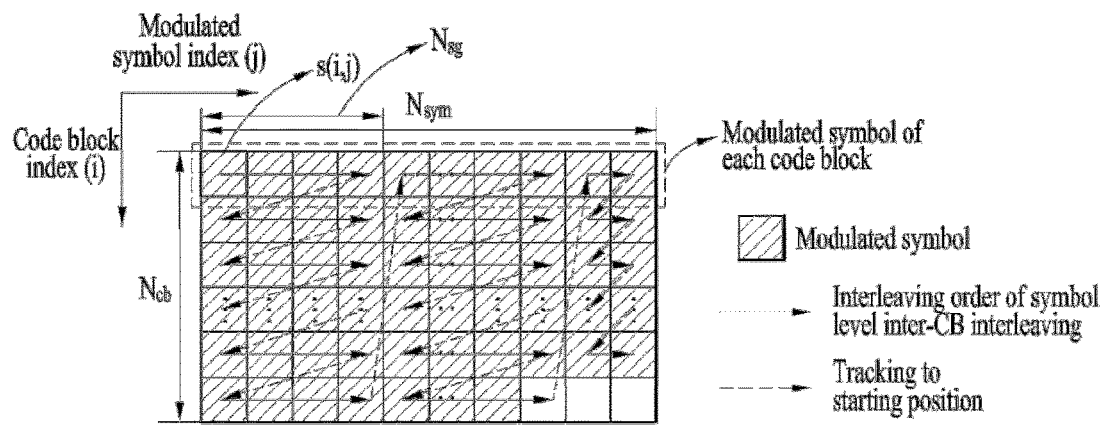
FIG. 21 is a diagram illustrating an example of symbol-level inter-CB interleaving for all code blocks (Nsg-symbol by Nsg-symbol).

FIG. 20 is a diagram illustrating an example of symbol-level inter-CB interleaving for all code blocks (1-symbol by 1-symbol), and FIG. 21 is a diagram illustrating an example of symbol-level inter-CB interleaving for all code blocks ($N_{sg}$-symbol by $N_{sg}$-symbol).

In FIGS. 20 and 21, $N_{sym}$ and $N_{cb}$ respectively mean the number of modulated symbols and the number of code blocks. In addition, i, j, and s(i,j) respectively mean a modulated symbol index, a code block index, and a $j^{th}$ modulated symbol of an $i^{th}$ code block. FIG. 21 shows an example of symbol-level inter-CB interleaving performed for all code blocks on an $N_{sg}$-symbol basis.

Symbol-Level Inter-CB Interleaving for Code Block Group

Figure 22:
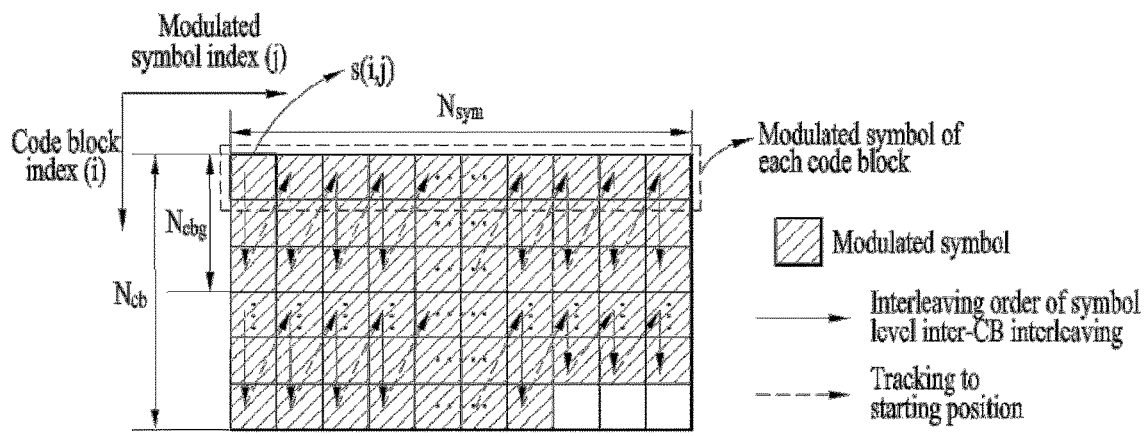
FIG. 22 is a diagram illustrating an example of symbol-level inter-CB interleaving for a code block group (1-symbol by 1-symbol)
Figure 23:
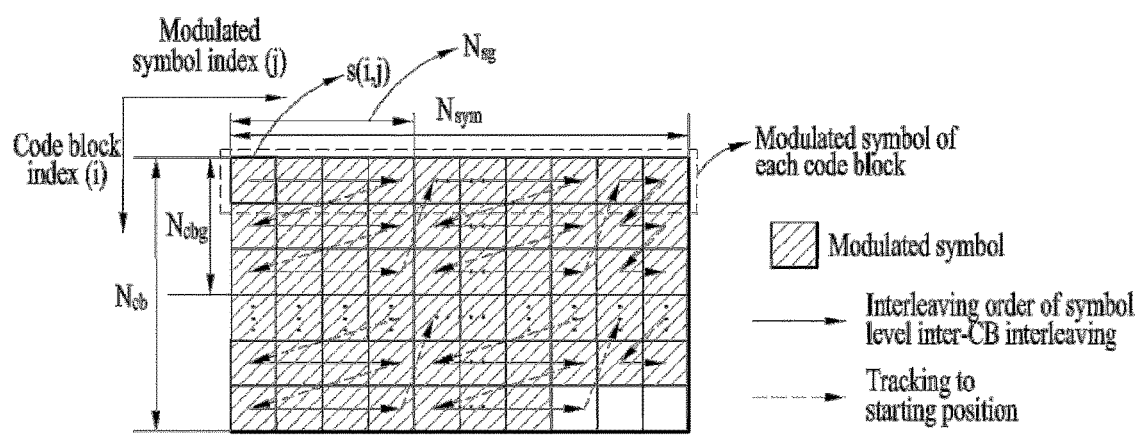
FIG. 23 is a diagram illustrating an example of symbol-level inter-CB interleaving for the code block group (Nsg-symbol by Nsg-symbol).

FIG. 22 is a diagram illustrating an example of symbol-level inter-CB interleaving for a code block group (1-symbol by 1-symbol), and FIG. 23 is a diagram illustrating an example of symbol-level inter-CB interleaving for the code block group ($N_{sg}$-symbol by $N_{sg}$-symbol).

In FIGS. 22 and 23, $N_{cbg}$ means the number of code blocks that define a code block group. FIG. 23 shows an example of symbol-level inter-CB interleaving performed for a code block group on the $N_{sg}$-symbol basis.

In the examples shown in FIGS. 22 and 23, a receiving end may perform decoding after receiving all code blocks included in the code block group. In this case, a CRC for each code block in the code block group may be defined on the code block group basis. That is, it is possible to mitigate the loss caused by the additional CRC bits by defining the CRC on the code block group basis rather than the code block basis as in the related art.

In all the proposed embodiments related to the inter-CB interleaving, bits or modulation symbols after the inter-CB interleaving pass through an OFDM signal generation process and then are transmitted from a BS to a UE through individual ports.

Proposal 5

In an environment where performance is significantly degraded due to a phase noise, a BS can transmit, to a UE, whether a phase noise compensation reference signal (PCRS) is used through downlink control information (DCI) or radio resource control (RRC) signaling. In this case, whether the PCRS is used or transmitted may be determined based on at least one of the following matters: a modulation and coding scheme (MCS) level, the number of (assigned or scheduled) traffic resource blocks (RBs), the number of transport code blocks (CBs), and whether inter-CB interleaving is used. For example, the BS may perform PCRS transmission when at least one of the following conditions is satisfied: when an MCS level is equal to or greater than a specific MCS level, when the number of traffic RBs is equal to or greater a specific number, when the number of transport CBs is equal to or greater than a specific number, and when the inter-CB interleaving is not used. To this end, the BS may inform the UE whether the PCRS is used through the DCI or RRC signaling. In addition, when the UE receives the PCRS based on information received through the DCI or RRC signaling, the UE may estimate and compensate impairment caused by the phase noise using the PCRS. Alternatively, the UE may estimate a phase error (e.g., CPE).

The phase noise may cause significant system performance degradation in high frequency bands. That is, when the performance is significantly degraded due to the phase noise, a reference signal (RS) for estimating and compensating a phase rotation caused by the phase noise is required. However, even when the PCRS is used, RS overhead may be increased. To overcome this disadvantage, the PCRS should be used in a selective manner, for example, when the phase noise significantly affects the performance. In particular, even when systems use the same carrier frequency, the impact of the phase noise may be changed according to transmission parameters. For example, when the MCS level is high, when the number of traffic RBs is high, when the number of CBs is high, or/and when the inter-CB interleaving is not used, the performance degradation caused by the phase noise is increased. The use of the PCRS may be limited to a specific case. In this case, the BS determines whether to use the PCRS depending on system situations and signals to the UE a result for whether the PCRS is used, thereby improving efficiency of the system.

Figure 24:
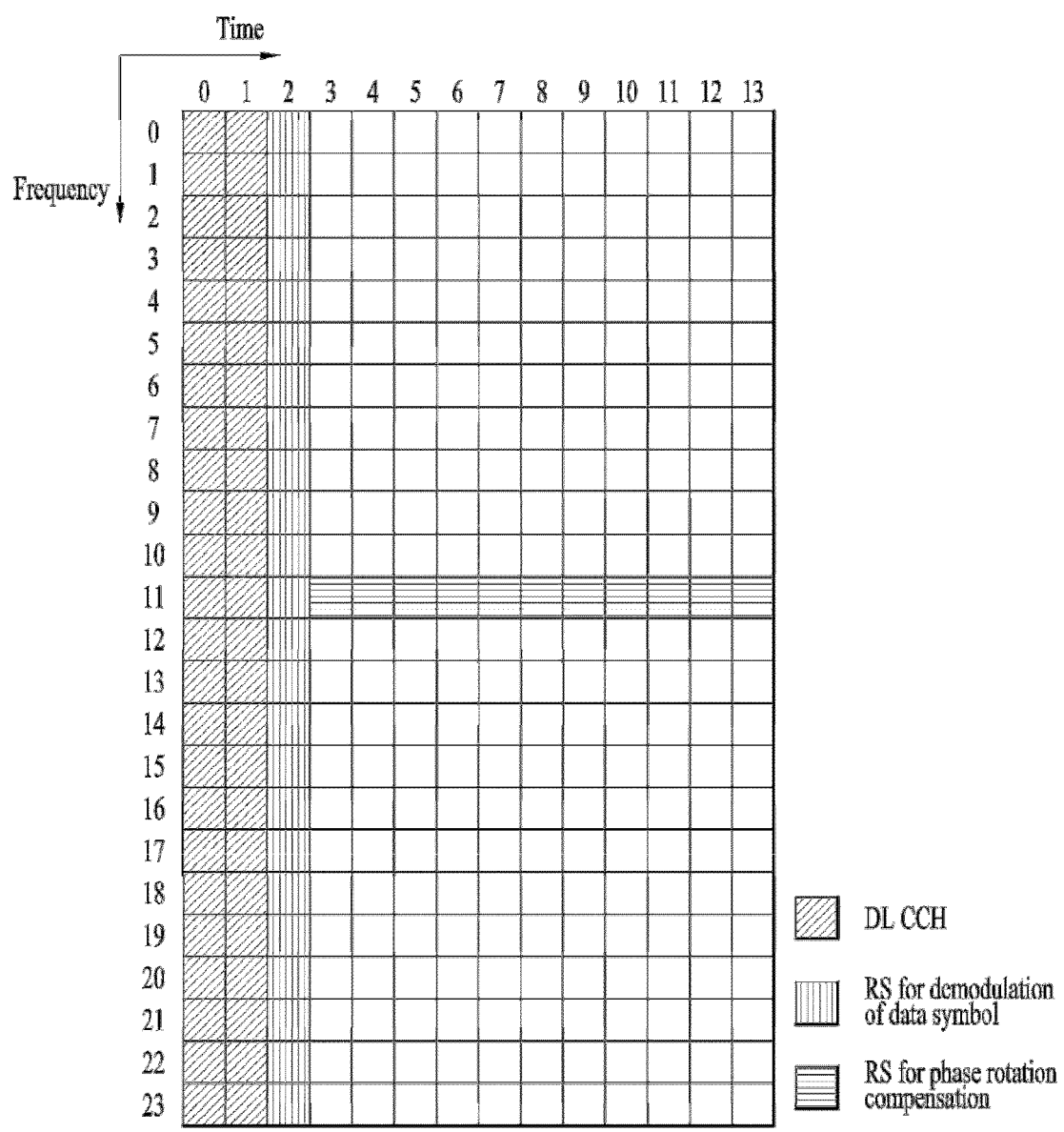
FIG. 24 is a diagram illustrating an example of PCRS arrangement (defined on a 2-RB basis).

FIG. 24 is a diagram illustrating an example of PCRS arrangement (defined on a 2-RB basis).

FIG. 24 shows an example of the PCRS defined on the 2-RB basis. When the following conditions are satisfied: an MCS level equal to or greater than a specific MCS level or/and the number of traffic RBs equal to or greater a specific number or/and the number of transport CBs equal to or greater than a specific number, or/and no use of the inter-CB interleaving, a BS may signal to a UE whether PCRS transmission is used in order to inform the UE whether the PCRS is used and then transmit the PCRS. When the BS indicate the use of the PCRS, the UE estimates and compensates impairment caused by the phase noise using the received PCRS.

In the example of FIG. 24, it is assumed that when the BS intends to transmit the PCRS, the BS signals to the UE whether the PCRS is transmitted (or used). However, the PCRS transmission can be triggered without additional signaling. For example, when the conditions of 'an MCS level equal to or greater than the specific MCS level or/and the number of traffic RBs equal to or greater the specific number or/and the number of transport CBs equal to or greater than the specific number, or/and no use of the inter-CB interleaving', which are predetermined between the BS and UE, are satisfied, a system may be defined such that the BS performs the PCRS transmission without additional signaling and the UE estimates and compensates the impairment caused by the phase noise using the received PCRS.

Proposal 6

A BS may inform a UE whether inter-CB interleaving is used through DCI/RRC signaling in order to selectively use the inter-CB interleaving scheme according to transmission environments. In this case, whether the inter-CB interleaving scheme is used may be determined with reference to at least one of an MCS level, the number of traffic RBs, and the number of transport CBs included in DCI/RRC. For example, of the MCS level is equal to or greater than the specific MCS level or/and the number of traffic RBs is equal to or greater the specific number, or/and the number of transport CBs is equal to or greater than the specific number are satisfied, the BS uses the inter-CB interleaving scheme and then signals the use of the inter-CB interleaving scheme to the UE. When signaling indicating whether the inter-CB interleaving is used indicates that the inter-CB interleaving scheme is used, the UE receives data by performing deinterleaving based on the inter-CB interleaving scheme.

The phase noise may cause significant system performance degradation in high frequency bands. In this case, the impairment caused by the phase noise may be categorized into two types: common phase error, which commonly occurs in the entire frequency bandwidth in an OFDM symbol basis, and inter-carrier interference. The impact of the phase noise may be changed in each OFDM symbol. That is, when the phase noise significantly affects a specific OFDM symbol, performance of the corresponding symbol may be significantly degraded. In addition, when a frequency-first mapping scheme is used, this may cause serious performance degradation due to reduction of the channel coding gain in the time domain. In particular, as in the LTE technology, when segmentation is applied to all transport blocks with reference to a specific maximum size and the frequency-first mapping scheme is used, the number of segmented code blocks decreases as the number of traffic RBs increases, and the number of modulation symbols for obtaining a coding gain within one code block in the time domain also decreases. Thus, it may cause a problem that the performance degradation due to the phase noise is increased. As a method for solving this problem, when the MCS level is equal to or greater than the specific MCS level or/and the number of traffic RBs is equal to or greater the specific number, or/and the number of transport CBs is equal to or greater than the specific number, i.e., in an environment where the impact of the phase noise may increase, a scheme in which a BS signals a UE to use the inter-CB interleaving scheme may be considered. However, if the number of CBs where the inter-CB interleaving is performed is large and the inter-CB interleaving is performed on all CBs, a decoding rate of the receiving end may be limited (decreased). To compensate this problem, the receiving end (e.g., UE) may perform the inter-CB interleaving by grouping CBs where the inter-CB interleaving will be performed based on a specific size.

Embodiment-1 of Proposal 6

The inter-CB interleaving of the proposal 6 may include all examples of inter-CB interleaving defined in the LTE/LTE-A system. In this case, a BS may inform a UE whether the inter-CB interleaving scheme is used (or performed) through DCI or RRC signaling, and values defined in each case are used for individual variables, B or/and Q or/and $N_{cbg}$, or/and $N_{sg}$. Here, B and Q are variables in Table 6, $N_{cbg}$ means a code block number for defining a code block group, and $N_{sg}$ means a symbol unit number when symbol-level inter-CB interleaving is performed for a code block group.

Alternatively, it is possible to adaptively select values of the variables B or/and Q of the embodiment-1 and embodiment-2 related to the inter-CB interleaving and use the adaptively selected values. That is, the BS may transmit, to the UE, information on whether the inter-CB interleaving scheme is used or/and information on B or/and in-formation on Q through the DCI or RRC signaling. Moreover, it is possible to adaptively select values of the variables $N_{cbg}$ or/and $N_{sg}$ of the embodiment-3 related to the inter-CB interleaving and use the adaptively selected values. That is, the BS may transmit, to the UE, information on whether the inter-CB interleaving scheme is used or/and information on $N_{cbg}$ or/and information on $N_{sg}$ through the DCI or RRC signaling.

Embodiment-2 of Proposal 6

According to the embodiment-1 of the proposal 6, when the inter-CB interleaving is performed, the BS may signal to the UE information on whether the inter-CB interleaving is performed (or used) or/and information on B or/and information on Q or/and information on $N_{cbg}$ or/and information on $N_{sg}$. However, the inter-CB interleaving may be triggered without additional signaling. That is, when a specific MCS level or/and a specific traffic RB number, or/and a specific transport CB number, which are predetermined between the BS and UE, are satisfied, the inter-CB interleaving is performed without additional signaling and in this case, the UE uses B or/and Q or/and $N_{cbg}$ or/and $N_{sg}$ defined in each case. Alternatively, the inter-CB interleaving is triggered as described above, but values of the parameters, B or/and Q or/and $N_{cbg}$ or/and $N_{sg}$ can be signaled by the BS to the UE through the DCI or RRC signaling.

In the above-described proposals 4, 5, and 6, downlink transmission is assumed.

However, all technologies and embodiments proposed in the proposals 4, 5, and 6 can be applied to uplink transmission where OFDM transmission is used.

Proposal 7

The number of PTRSs in the frequency domain may be fixed to a specific value regardless of the number of traffic RBs (TRBs). FIGS. 8 and 9 show that when the number of PTRSs in the frequency domain is 4 or 8, a BLER curve approaches that in an ideal case. That is, it can be seen that the number of PTRSs in the frequency domain is determined irrespective of the number of TRBs. Thus, if the number of PTRSs in the frequency domain is assumed to be N, N can be defined as follows. According to the specification, N can be defined by a rule. That is, N may be determined as 4 or 8 regardless of the number of TRBs. Alternatively, a BS may inform a UE of the number of PTRs, N through the RRC signaling or DCI.

Figure 25:
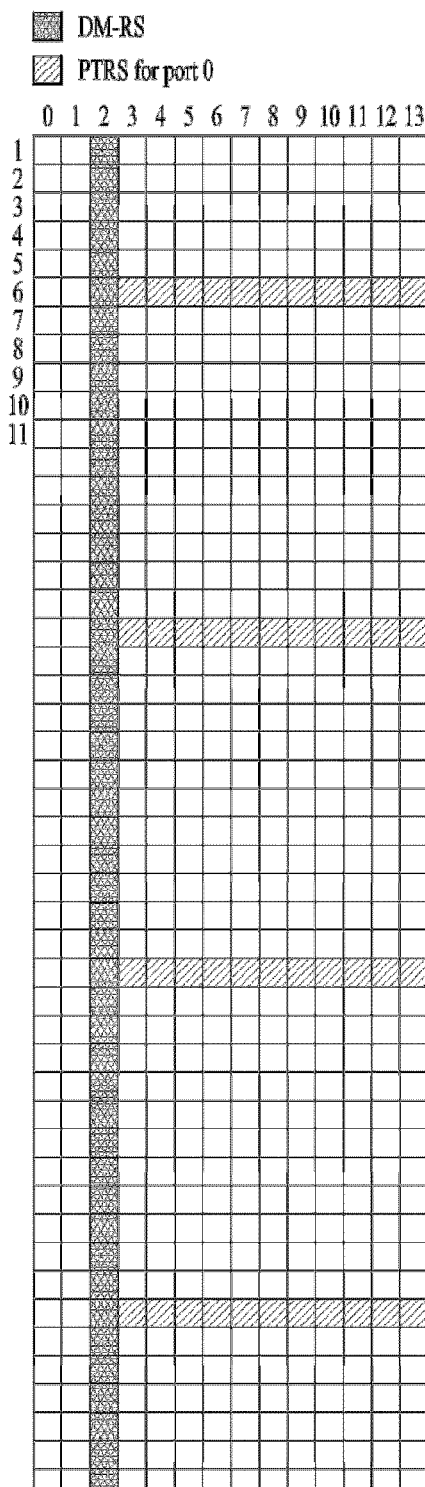
FIG. 25 is a diagram illustrating two types of PTRSs: a distributed type of PTRS and a localized type of PTRS when the number of PTRSs is 4.
Figure 25:
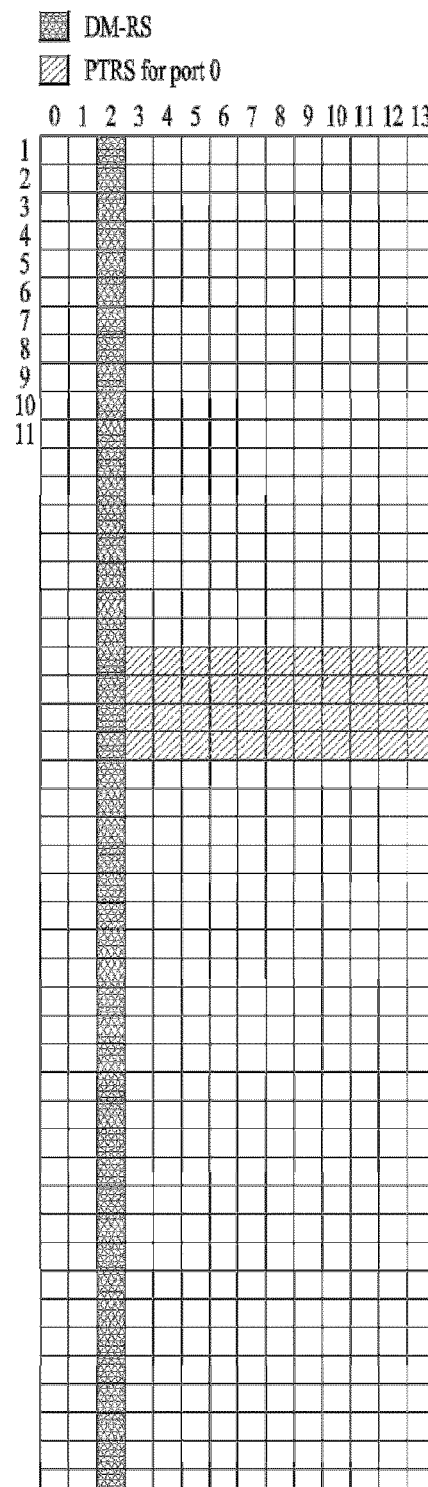

FIG. 25 is a diagram illustrating two types of PTRSs: a distributed type of PTRS and a localized type of PTRS when the number of PTRSs is 4.

In FIG. 25, the distributed type means to design a frequency spacing between PTRSs to be uniform within a given TBS. On the other hand, the localized type means to locate PTRSs at the center of the given TBS or a specific position. A BS may inform a UE whether the distributed type or the localized type is used through the DCI or RRC signaling. Alternatively, one of the types may be predefined by a rule.

Meanwhile, the number of PTRSs in the frequency domain may be changed in consideration of a TRB size. When the TRB has a large size, RS overhead decreases, it is possible to improve the CFO and CPE estimation performance by allocating more RSs in the frequency domain. Consequently, the number of PTRSs in the frequency domain can be defined as follows.

---

If TRB size <= N (e.g. 8)
   number(#) of PTRS in the frequency domain = M1 (e.g.4)
Else
   number (#) of PTRS in the frequency domain = M2 (e.g.8)

---

In this case, the BS may transmit values of N, M1, and M2 to the UE through the RRC signaling or DCI. Alternatively, the values of N, M1, and M2 may be defined or determined by a rule in advance.

Proposal 8

A PTRS interval in the time domain (PTRS time interval) can be fixed to a specific value regardless of the number of traffic RBs (TRBs). FIG. 14 illustrates spectral efficiency depending on a TRB size and a PTRS time interval. In FIG. 14, when the TRB size is 4, a case in which the interval is 2 shows better performance than a case in which the interval is 1. Meanwhile, when the TRB size is 64, the case in which the interval is 1 shows better performance than the case in which the interval is 2. In other words, when the TRB size is small, a throughput loss due to RS overhead may be higher than a gain obtained from CPE compensation. Thus, depending on the TRB size, the PTRS time interval can be defined as follows.

1. In case of TRB size≤N (e.g., 8), PTRS time interval is defined as M1 (e.g., 2).
2. In case of TRB size>N, PTRS time interval is defined as M2 (e.g., 1).

In this case, N, M1, and M2 can be defined according to a predetermined rule. Alternatively, the BS may transmit values of N, M1, and M2 to the UE through the RRC signaling or/and DCI. Meanwhile, the PTRS time interval can be determined by the TRB size, a code rate (CR), or/and a modulation order (MO). In FIG. 14, the MO and CR are set to 64-QAM and 5/6, respectively. If the MO or CR increases, the time interval may be decreased to 1 rather than 2. That is, the above embodiment can be modified as follows.

---

If TRB size <= N (e.g. 8) [192] If CR <= M (e.g. 5/6)
   PTRS time interval = 2
Else
   PTRS time interval = 1
Else
   PTRS time interval = 1.

---

Meanwhile, the PTRS can be used for carrier frequency offset (CFO) estimation. In this case, the BS may determine a random PTRS time interval and then transmit in-formation on the determined PTRS time interval to the UE. Alternatively, when the CFO estimation is performed only, the PTRS time interval has already been determined between a transmitter and a receiver. If necessary, the BS may signal to the UE on/off of the corresponding PTRS time interval through the DCI.

Figure 26:
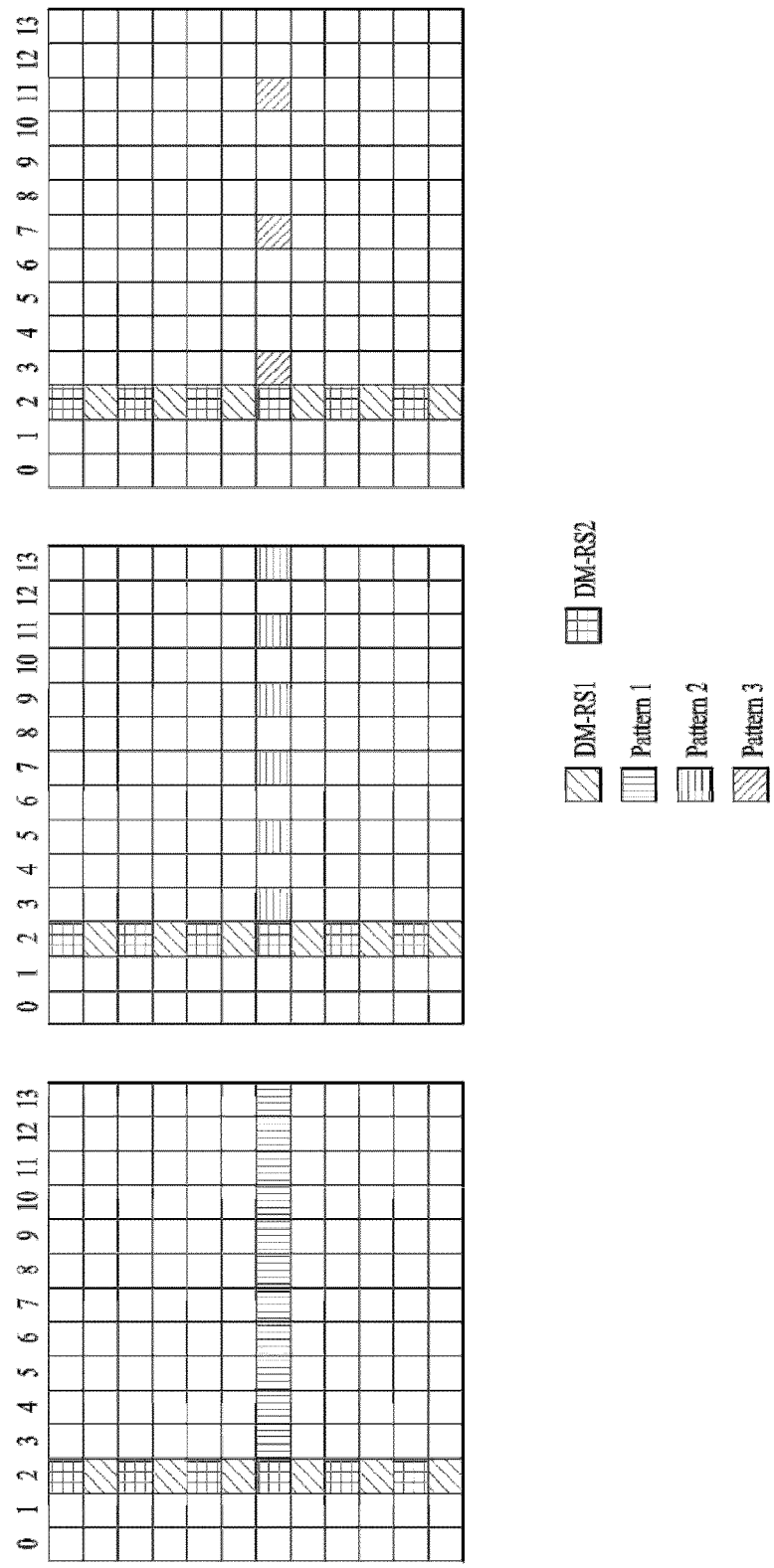
FIG. 26 is a diagram illustrating examples of PTRS patterns.

FIG. 26 is a diagram illustrating examples of PTRS patterns.

With reference to FIG. 26, PTRS patterns can be determined as follows according to different MCSs and PRBs.

1). High MCS (e.g., #26)+large PRB (e.g., 32 PRBs): Pattern 1 shown in FIG. 26

2). High MCS (e.g., #26)+middle PRB (e.g., 8 PRBs): Pattern 2 shown in FIG. 26

3). Low MCS (e.g., #16) or small PRB (e.g., 4 PRBs): Pattern 3 shown in FIG. 26

Meanwhile, the BS can transmit mapping information between the PTRS pattern and MCSs/PRBs to the UE through the RRC signaling or DCI. Alternatively, mapping between the PTRS patterns and MCSs/PRBs can be pre-defined according to a rule.

In addition, the RS overhead can be minimized by adaptively adjusting the PTRS pattern according to an MCS level or/and a PRB size. For example, when the PRB size is small, the RS overhead can be minimized by applying the pattern 3 of FIG. 26 only. On the other hand, when the PRB size is large, the pattern 1 of FIG. 26 is applied. However, the RS overhead is relatively decreased due to the large PRB size.

Proposal 9

A PTRS mapping scheme can be determined according to TRB sizes.

FIG. 15 shows that when time-first mapping is performed on data, it is more robust to a phase noise compared to frequency-first mapping. Meanwhile, in FIGS. 8, 9, and 10, only a single code block is defined when the TRB size is small. Thus, even though the frequency-first mapping is performed, the result is the same as that of the time-frequency mapping. However, it can be seen that when the TRB size is large, the time-first mapping or code spreading in the time domain guarantees a higher performance gain.

Consequently, the PTRS mapping scheme can be determined as follows.

1. In case of TRB size<=N (e.g., 8), frequency-first mapping is performed on data.

2. In case of TRB size>N, time first mapping or code spreading in the time domain or new code spreading is performed on data.

In this case, a new code spreading scheme includes all the proposed methods related to the inter-CB interleaving. Meanwhile, N can be predefined according to a rule. Alternatively, the BS may inform the UE of N through the DCI or RRC signaling. In addition, in the case of the URLLC service where decoding latency is very important, the frequency-first mapping can be always performed regardless of N. Moreover, when the code rate or modulation order is decreased, performance degradation due to the frequency-first mapping is also decreased. Thus, in this case, N may be determined based on the TRB size and/or the code rate and/or the modulation order.

Proposal 10

Whether a PTRS is transmitted is determined by a TRB size and capabilities of a BS and/or UE.

FIG. 11 shows that a case in which no PTRS is transmitted has better performance than a case in which a PTRS is transmitted. Meanwhile, FIG. 12 shows that when a CFO of 1.4 kHz occurs, communication fails if a PTRS is not transmitted. If the CFO magnitude is extremely small due to excellent oscillators of the UE and BS and the TRB size is also small, it is better not to transmit the PTRS. To this end, the UE may transmit information related to its CFO (e.g., oscillator, movement, or speed) to the BS. Thereafter, the BS may determine whether the PTRS is transmitted based on the information related to the UE's CFO and then inform the UE whether the PTRS is transmitted.

Shared PTRS (PTRS Shared with Another UE)

The PTRS can be divided into a shared PTRS (i.e., PTRS shared with another UE) and a UE-dedicated PTRS (i.e., PTRS allocated to a specific UE in a dedicated manner).

Proposal 11: A PTRS resource can be defined by an RB index or/and a symbol index.

A BS can transmit information at least one of defined PTRS resources to a UE through RRC signaling or DCI. In addition, the BS can signal to the UE a selected PTRS resource through the DCI.

Figure 27:
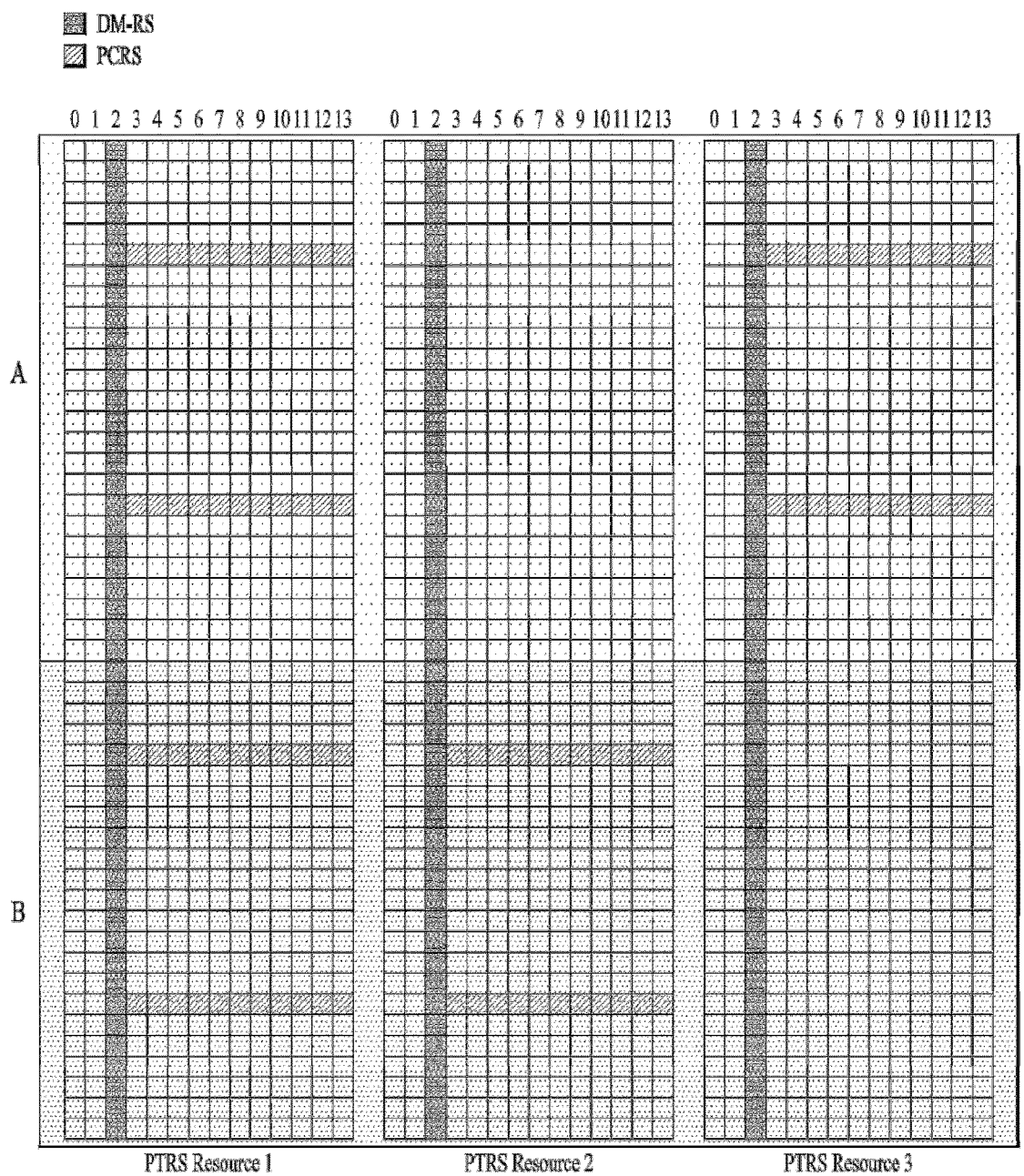
FIG. 27 is a diagram illustrating examples of PTRS resource sets.

FIG. 27 is a diagram illustrating examples of PTRS resource sets.

FIG. 27 shows three PTRS resource sets. Specifically, in the case of PTRS resource 1, a PTRS is defined in both regions A and B, in the case of PTRS resource 2, a PTRS is defined only in the region A, and in the case of PTRS resource 3, a PTRS is defined only in the region B. The BS can transmit information on all the three PTRS resource sets to the UE through the RRC signaling. In addition, the BS can transmit information on the currently managed PTRS resource (or the selected PTRS resource) to the UE through the DCI. If RBs in the region A are allocated to the UE and the PTRS resource 3 is configured for the UE, the UE performs CPE estimation using PTRS resources included in its region. If the PTRS resource 2 is configured for the UE, the UE performs CPE estimation using PTRS resources in the region B. Further, if the PTRS resource 1 is configured for the UE, the UE performs CPE estimation more accurately using all PTRS resources in both the regions A and B.

Meanwhile, the BS defines subframes as the PTRS resource 2 and assumes a situation in which RBs in the region B are allocated to the UE although the UE does not need to perform CPE compensation. In this case, the BS transmits information on PTRS resources to the corresponding UE through the DCI, and the UE grasps locations of the PTRS resources through the DCI and does not process the PTRS resources as REs for data. If the RBs in the region A are allocated to the UE, the BS does not need to inform the currently defined PTRS resources through the DCI.

Proposal 11-1

Figure 28:
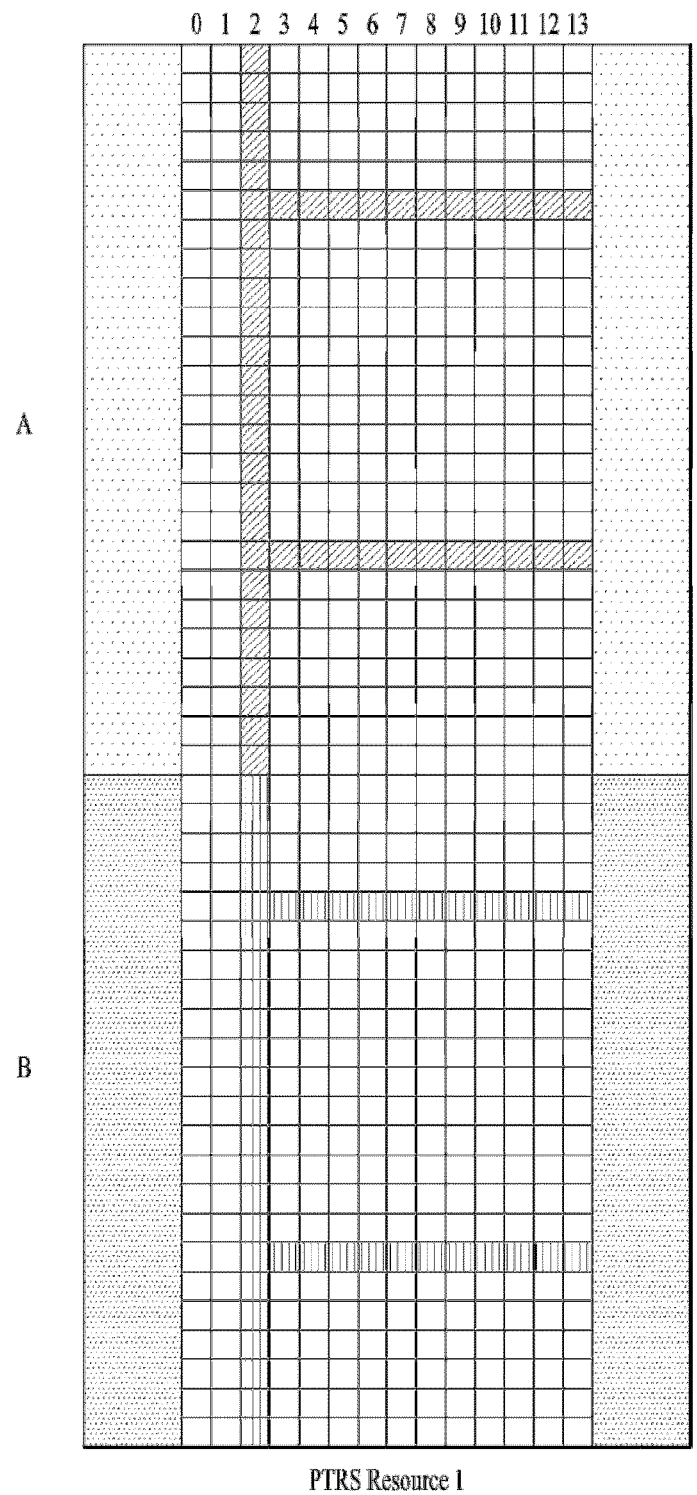
FIG. 28 is a diagram illustrating precoded PTRS resource 1.

FIG. 28 is a diagram illustrating precoded PTRS resource 1.

In the proposal 11, PTRS precoding is performed according to DMRS precoding in a corresponding RB. In FIG. 28, it is assumed that region A is allocated to UE 1 and region B is allocated to UE 2. In this case, PTRS precoding defined in the regions A and B is the same as DMRS precoding defined in the respective regions. If PTRS resource 1 is configured for the UE 1, the UE 1 can recognize that PTRSs are present in the region B and thus perform more accurate CPE estimation using the PTRSs.

Meanwhile, if PTRS resource 2 is configured for the UE 2, the UE 2 cannot recognize that PTRSs are present in the region A. Thus, the UE 2 performs CPE estimation using only the PTRSs defined in the region B.

Proposal 11-2

Figure 29:
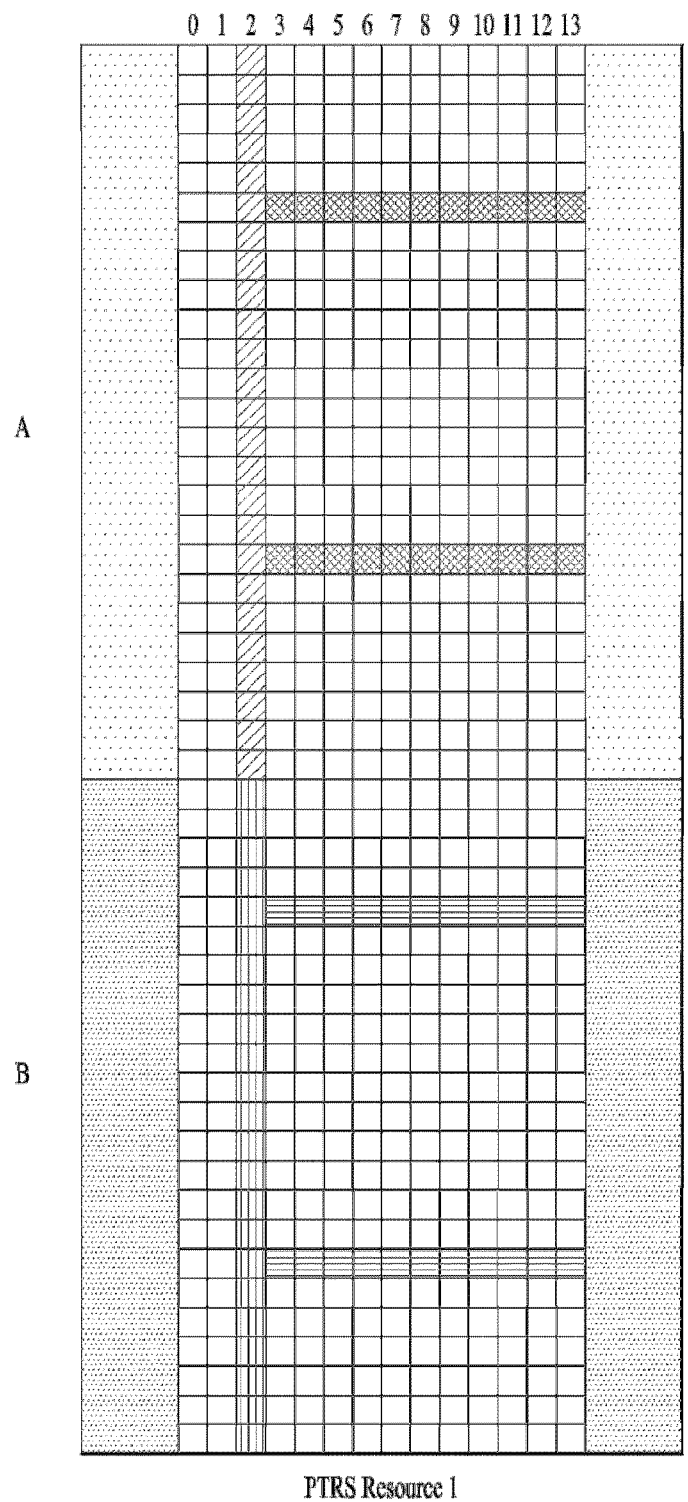
FIG. 29 is a diagram illustrating precoding cycling based PTRS type A.
Figure 30:
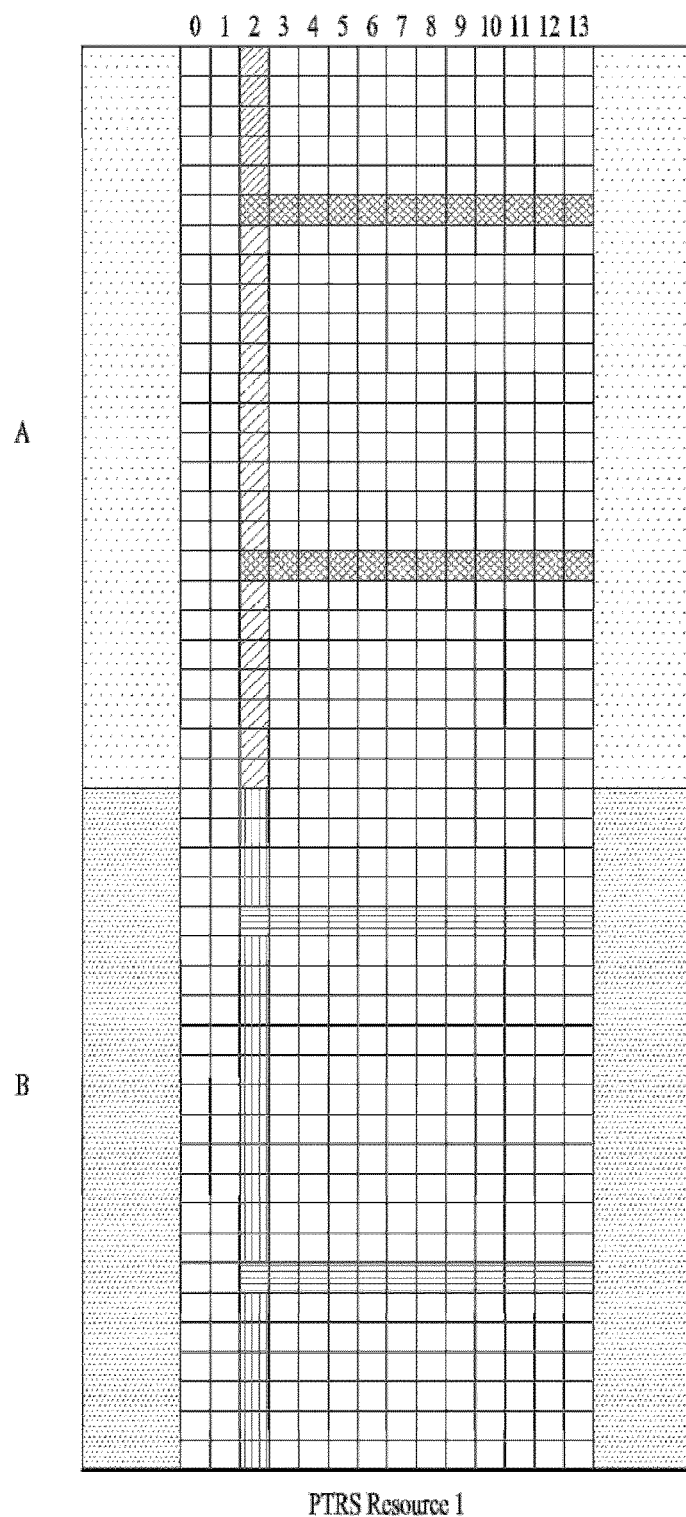
FIG. 30 is a diagram illustrating precoding cycling based PTRS type B.

FIG. 29 is a diagram illustrating precoding cycling based PTRS type A, and FIG. 30 is a diagram illustrating precoding cycling based PTRS type B.

In the proposal 11, the PTRS precoding can be defined to be performed in the form of cycling in an RB-group-wise manner. In addition, in the proposal 11-1, since the precoding in the regions A and B is performed according to the DMRS precoding in the respective regions, the precoding in the region A may be identical to or different from that in the region B. However, according to the proposal 11-2, precoding in regions A and B does not relate to DMRS precoding in the respective regions, the precoding in the region A may be defined to be different from that in the region B. In this case, since different PTRS precoding is defined, a UE can obtain spatial diversity when performing CPE estimation.

Meanwhile, some REs for DMRSs can be replaced with PTRSs as shown in FIG. 30. In this case, although CPE estimation performance between second and third symbols can be improved, channel estimation performance through DMRSs may be decreased partially.

Proposal 11-3

Figure 31:
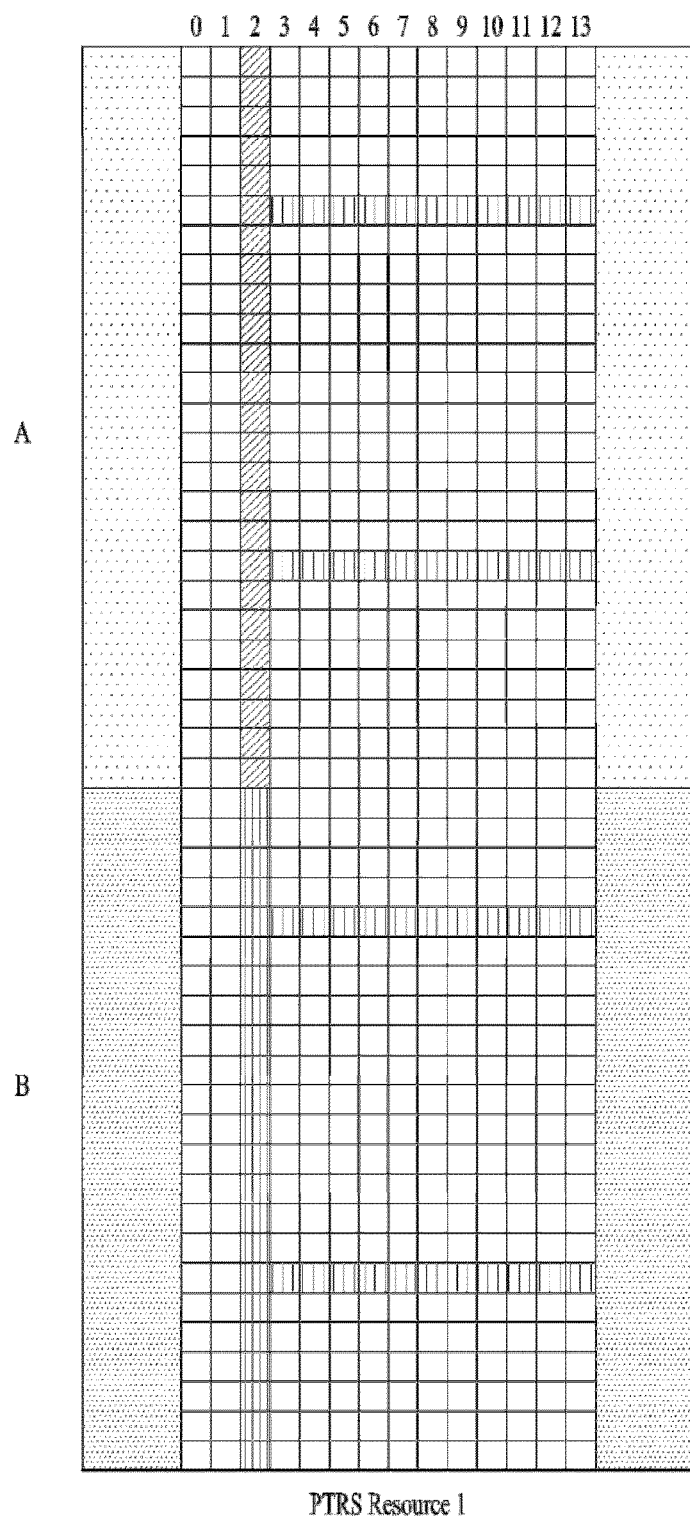
FIG. 31 is a diagram illustrating an example of a non-precoded PTRS. [45]

FIG. 31 is a diagram illustrating an example of a non-precoded PTRS.

In the proposal 11, the PTRS can be defined in the form of non-precoding. FIG. 31 shows that all PTRSs are defined in the form of the non-precoding. In this case, the PTRSs in regions A and B of FIG. 31 are received with the same beam gain.

Meanwhile, likewise FIG. 30, some REs for DMRSs can be replaced with the non-precoded PTRS.

In addition, a BS can configure such a precoding scheme for a UE through RRC signaling. Alternatively, the precoding scheme may be included in a PTRS resource configuration in the proposal 11.

Figure 32:
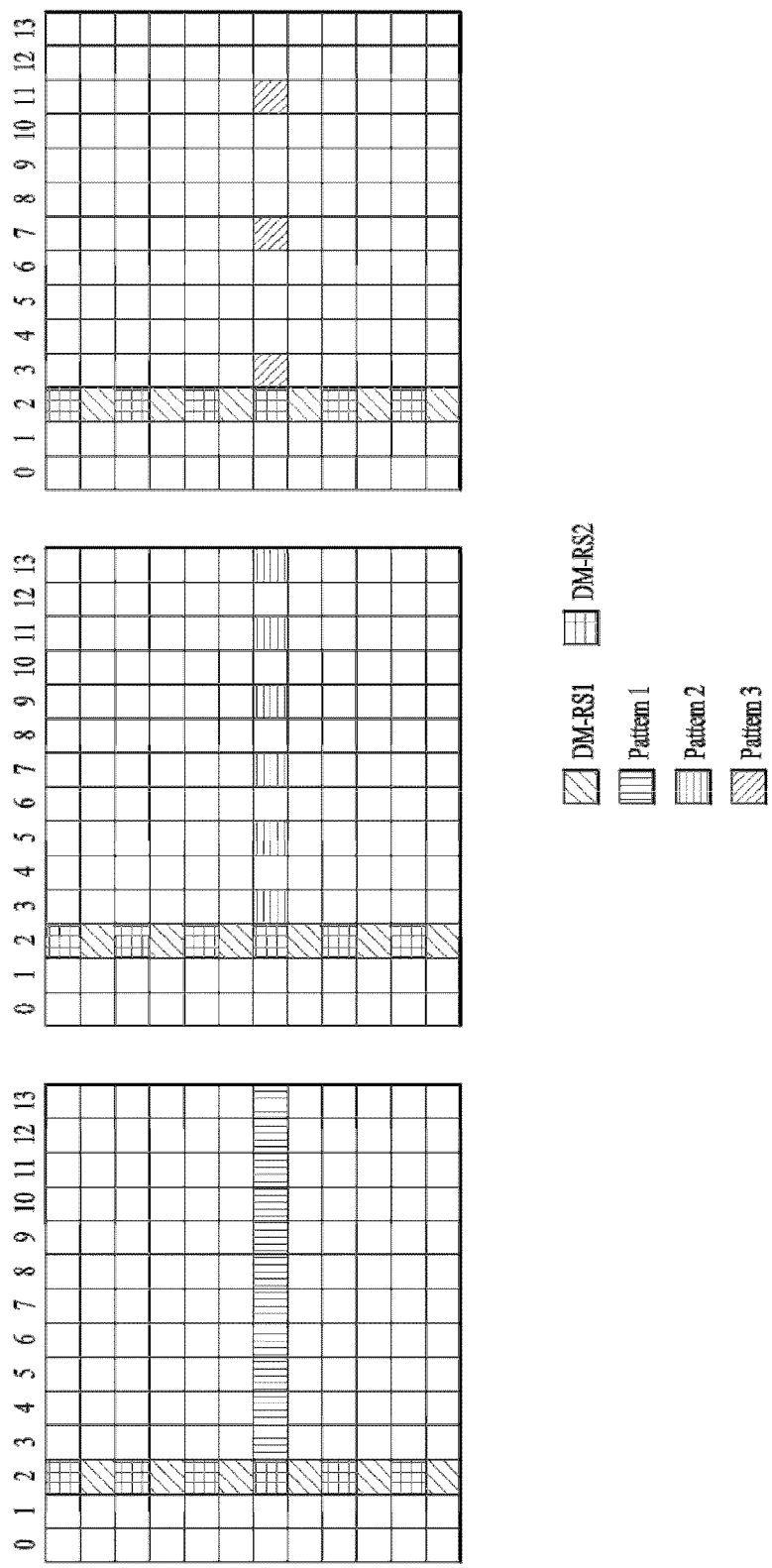
FIG. 32 is a diagram illustrating PTRS patterns.

FIG. 32 is a diagram illustrating PTRS patterns.

In FIG. 32, a seventh OFDM symbol should be received to calculate a channel value of a fourth OFDM symbol. However, this may cause a serious problem to an application where latency is important. Meanwhile, there is no latency issue in pattern 1 illustrated in FIG. 32. Accordingly, in the case of a service where the latency is important, the pattern 1 needs to be selected even though a TRB size is small.

Cell-Specific PTRS

In different cells, a location of the shared PTRS may be defined to be different in the frequency/time domain. In this case, the shared PTRS location may be configured by a BS for a UE through RRC signaling or defined based on a cell ID. In the different cells, the shared PTRS location in the time domain may be placed next to a DMRS. In addition, when the same precoding as that of the DMRS is used, the shared PTRS is defined on symbols with the same index in the time domain. In the different cells, the shared PTRS location in the time domain may be placed next to the DMRS. Moreover, when precoding different from that of the DMRS is used or there is no precoding (i.e., non-precoding), the shared PTRS can be defined as symbols corresponding to two symbol indices in the time domain.

The UE may transmit a parameter related to its phase noise level to the BS through the RRC signaling or the like, and the BS may determine the PTRS pattern or whether to transmit the PTRS based on the parameter transmitted from the UE. Here, the PTRS pattern may be determined according to a TRB size, code rate, modulation order, and service type.

Hereinabove, the invention has been described by being divided into various embodiments for convenience of description. However, the embodiments can be combined with each other to implement the present invention.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

A method for receiving control information for a reference signal related to phase noise estimation and user equipment therefor can be industrially applied to various wireless communication systems such as the 3GPP LTE/LTE-A system, 5G system, and the like.

The invention claimed is:

1. A method of transmitting a reference signal for phase tracking, the method performed by a user equipment (UE) and comprising:
    receiving, from a base station (BS), information for a threshold criteria related to a size of traffic resource blocks (RBs);
    determining a frequency interval between consecutive frequency resources in which the reference signal for phase tracking is to be transmitted,
    wherein based on the size of the traffic RBs satisfying the threshold criteria, the frequency interval is determined as a first value,
    wherein based on the size of the traffic RBs not satisfying the threshold criteria, the frequency interval is determined as a second value, and
    wherein the first value is smaller than the second value; and
    transmitting, to the BS and based on the determined frequency interval, the reference signal for phase tracking.

2. The method of claim 1, further comprising:
    receiving control information from the BS, the control information comprising information for a modulation and coding scheme (MCS) level and information for the size of the traffic RBs; and
    based on the MCS level being larger than a specific level and the size of the traffic RBs being larger than a specific size, determining that the reference signal for phase tracking is to be transmitted to the BS.

3. The method of claim 2, wherein the control information is received through downlink control information (DCI).

4. The method of claim 1, wherein the reference signal comprises a phase tracking reference signal (PT-RS).

5. The method of claim 1, wherein the information for the threshold criteria is received through radio resource control (RRC) signaling.

6. A user equipment (UE) configured to operate in a wireless communication system, the UE comprising:
- at least one transmitter;
- at least one processor; and
- at least one computer memory operably connectable to the at least one processor and storing instructions that, when executed, cause the at least one processor to perform operations comprising:
  - receiving, from a base station (BS), information for a threshold criteria related to a size of traffic resource blocks (RBs);
  - determining a frequency interval between consecutive frequency resources in which a reference signal for phase tracking is to be transmitted,
  - wherein based on the size of the traffic RBs satisfying the threshold criteria, the frequency interval is determined as a first value,
  - wherein based on the size of the traffic RBs not satisfying the threshold criteria, the frequency interval is determined as a second value, and
  - wherein the first value is smaller than the second value; and
  - transmitting, to the BS through the at least one transmitter and based on the determined frequency interval, the reference signal for phase tracking.

7. The UE of claim 6, wherein the operations further comprise:
- receiving control information from the BS, the control information comprising information for a modulation and coding scheme (MCS) level and information for the size of the traffic RBs; and
- based on the MCS level being larger than a specific level and the size of the traffic RBs being larger than a specific size, determining that the reference signal for phase tracking is to be transmitted to the BS.

8. The UE of claim 7, wherein the control information is received through downlink control information (DCI).

9. The UE of claim 6, wherein the reference signal comprises a phase tracking reference signal (PT-RS).

10. The UE of claim 6, wherein the information for the threshold criteria is received through radio resource control (RRC) signaling.

11. A method of receiving a reference signal for phase tracking, the method performed by a base station (BS) and comprising:
- transmitting, to a user equipment (UE), information for a threshold criteria related to a size of traffic resource blocks (RBs);
- determining a frequency interval between consecutive frequency resources in which the reference signal for phase tracking is to be received,
- wherein based on the size of the traffic RBs satisfying the threshold criteria, the frequency interval is determined as a first value,
- wherein based on the size of the traffic RBs not satisfying the threshold criteria, the frequency interval is determined as a second value, and
- wherein the first value is smaller than the second value; and
- receiving, from the UE and based on the determined frequency interval, the reference signal for phase tracking.

12. The method of claim 11, further comprising:
- transmitting control information to the UE, the control information comprising information for a modulation and coding scheme (MCS) level and information for the size of the traffic RBs; and
- based on the MCS level being larger than a specific level and the size of the traffic RBs being larger than a specific size, determining that the reference signal for phase tracking is to be received from the UE.

13. The method of claim 12, wherein the control information is transmitted through downlink control information (DCI).

14. The method of claim 11, wherein the reference signal comprises a phase tracking reference signal (PT-RS).

15. The method of claim 11, wherein the information for the threshold criteria is transmitted through radio resource control (RRC) signaling.

16. A base station (BS) configured to operate in a wireless communication system, the BS comprising:
- at least one receiver;
- at least one processor; and
- at least one computer memory operably connectable to the at least one processor and storing instructions that, when executed, cause the at least one processor to perform operations comprising:
  - transmitting, to a user equipment (UE), information for a threshold criteria related to a size of traffic resource blocks (RBs);
  - determining a frequency interval between consecutive frequency resources in which the reference signal for phase tracking is to be received,
  - wherein based on the size of the traffic RBs satisfying the threshold criteria, the frequency interval is determined as a first value,
  - wherein based on the size of the traffic RBs not satisfying the threshold criteria, the frequency interval is determined as a second value, and
  - wherein the first value is smaller than the second value; and
  - receiving, from the UE through the at least one receiver and based on the determined frequency interval, the reference signal for phase tracking.

17. The BS of claim 16, wherein the operations further comprise:
- transmitting control information to the UE, the control information comprising information for a modulation and coding scheme (MCS) level and information for the size of the traffic RBs; and
- based on the MCS level being larger than a specific level and the size of the traffic RBs being larger than a specific size, determining that the reference signal for phase tracking is to be received from the UE.

18. The BS of claim 17, wherein the control information is transmitted through downlink control information (DCI).

19. The BS of claim 16, wherein the reference signal comprises a phase tracking reference signal (PT-RS).

20. The BS of claim 16, wherein the information for the threshold criteria is transmitted through radio resource control (RRC) signaling.

* * * * *